US009193868B1

(12) United States Patent
Sato et al.

(10) Patent No.: US 9,193,868 B1
(45) Date of Patent: Nov. 24, 2015

(54) ARTICLE COMPRISING POLY(PHENYLENE ETHER)-POLYSILOXANE COPOLYMER COMPOSITION

(71) Applicant: SABIC Global Technologies B.V., Bergen op Zoom (NL)

(72) Inventors: Sho Sato, Moka (JP); Christian Lietzau, Delmar, NY (US)

(73) Assignee: SABIC GLOBAL TECHNOLOGIES B.V. (NL)

(*) Notice: Subject to any disclaimer, the term of this patent is extended or adjusted under 35 U.S.C. 154(b) by 0 days.

(21) Appl. No.: 14/270,478

(22) Filed: May 6, 2014

(51) Int. Cl.
*C08L 71/12* (2006.01)
*C08L 83/12* (2006.01)

(52) U.S. Cl.
CPC .............. *C08L 83/12* (2013.01); *C08L 71/12* (2013.01); *C08L 2201/02* (2013.01); *C08L 2205/03* (2013.01)

(58) Field of Classification Search
CPC .................................................... H01B 3/427
USPC ............................................................ 524/127
See application file for complete search history.

(56) References Cited

U.S. PATENT DOCUMENTS

| | | | |
|---|---|---|---|
| 4,808,647 | A | 2/1989 | Abolins et al. |
| 5,204,438 | A | 4/1993 | Snow et al. |
| 5,281,686 | A | 1/1994 | Blohm et al. |
| 5,294,654 | A | 3/1994 | Hellstern-Burnell et al. |
| 5,357,022 | A | 10/1994 | Banach et al. |
| 5,488,467 | A | 1/1996 | Marentes et al. |
| 5,499,087 | A | 3/1996 | Hiraoka et al. |
| 6,093,759 | A * | 7/2000 | Gareiss et al. ................. 524/122 |
| 6,165,309 | A | 12/2000 | Brunelle et al. |
| 6,339,131 | B1 | 1/2002 | Cella et al. |
| 6,576,700 | B2 | 6/2003 | Patel |
| 7,291,036 | B1 | 11/2007 | Daily et al. |
| 7,824,189 | B1 | 11/2010 | Lauermann et al. |
| 8,017,697 | B2 | 9/2011 | Carrillo et al. |
| 8,062,747 | B2 | 11/2011 | Harada et al. |
| 8,252,858 | B2 | 8/2012 | Kishore et al. |
| 8,722,837 | B2 | 5/2014 | Carrillo et al. |
| 2004/0147646 | A1* | 7/2004 | Harashina et al. ............ 524/115 |
| 2006/0122310 | A1 | 6/2006 | Matthijssen |
| 2007/0112132 | A1 | 5/2007 | Zhao et al. |
| 2007/0208144 | A1 | 9/2007 | Delsman et al. |
| 2008/0167407 | A1 | 7/2008 | Kishore et al. |
| 2008/0246186 | A1 | 10/2008 | Fisher et al. |
| 2010/0130670 | A1 | 5/2010 | Gelles et al. |
| 2010/0139944 | A1* | 6/2010 | Guo et al. ................ 174/110 SR |
| 2010/0168293 | A1 | 7/2010 | Sawant et al. |
| 2010/0218797 | A1 | 9/2010 | Coyle, Jr. et al. |
| 2010/0294903 | A1 | 11/2010 | Shmukler et al. |
| 2011/0152420 | A1* | 6/2011 | Elkovitch et al. .............. 524/133 |
| 2011/0152431 | A1 | 6/2011 | Elkovitch et al. |
| 2011/0152471 | A1 | 6/2011 | Kamalakaran et al. |
| 2012/0329961 | A1 | 12/2012 | Carrillo et al. |
| 2013/0030096 | A1 | 1/2013 | Lietzau |
| 2013/0331492 | A1 | 12/2013 | Sharma et al. |
| 2014/0073725 | A1 | 3/2014 | Tople et al. |
| 2014/0128522 | A1 | 5/2014 | Lietzau et al. |

OTHER PUBLICATIONS

Non Final Office Action Dated Sep. 10, 2014; U.S. Appl. No. 14/270,408, filed May 6, 2014; 26 pages.
Non Final Office Action Dated Sep. 9, 2014; U.S. Appl. No. 14/270,421, filed May 6, 2014; 26 pages.
Non-Final Office Action for U.S. Appl. No. 13/189,651, filed Jul. 25, 2011, Date of Notification Mar. 18, 2013, 53 pages.
Non-Final Office Action for U.S. Appl. No. 13/189,651, filed Jul. 25, 2011, Notification Date Apr. 16, 2014, 14 pages.
International Search Report for International Application No. PCT/US2012/044897; International Application Filing Date: Jun. 29, 2012; Date of Mailing Jan. 23, 2013; 5 pages.
Written Opinion for International Application No. PCT/US2012/044897; International Application Filing Date: Jun. 29, 2012; Date of Mailing Jan. 23, 2013; 3 pages.
International Search Report for International Application No. PCT/US2012/069338; International Application Filing Date Dec. 13, 2012; Date of Mailing: May 30, 2013; 4 pages.
Written Opinion for International Application No. PCT/US2012/069338; International Application Filing Date Dec. 13, 2012; Date of Mailing: May 30, 2013; 4 pages.
International Search Reprot; International Application No. PCT/US2013/068364; International Filing Date Nov. 5, 2013; 5 pages.
Written Opinion of International Search Authority; International Application No. PCT/US2013/068364; International Filing Date Nov. 5, 2013; 6 pages.
Notice of Allowance dated Nov. 24, 2014; U.S. Appl. No. 14/270,408, filed May 6, 2014.
Notice of Allowance dated Nov. 25, 2014; U.S. Appl. No. 14/270,408, filed May 6, 2014.
U.S. Appl. No. 13/189,651, filed Jul. 25, 2011; Final Office Action; Mailed Sep. 6, 2013; (23 pages).
International Search Report mailed Jul. 17, 2015; International Application No. PCT/US2015/025512; International Filing Date Apr. 20, 2015 (5 pages).
Written Opinion mailed Jul. 17, 2015; International Application No. PCT/US2015/026612; International Filing Date Apr. 20, 2015 (7 pages).

* cited by examiner

*Primary Examiner* — Doris Lee
(74) *Attorney, Agent, or Firm* — Cantor Colburn LLP

(57) ABSTRACT

Articles exhibiting flame retardancy and heat resistance are fabricated from a composition that includes specific amounts of a poly(phenylene ether)-polysiloxane block copolymer reaction product, a flame retardant, and a reinforcing filler. Articles benefiting from the composition's properties include fuser holders for electrophotographic copiers, fan blades, battery parts for hybrid and electric vehicles, parts for automotive kinetic energy recovery systems, and electric vehicle junction boxes.

14 Claims, No Drawings

ARTICLE COMPRISING POLY(PHENYLENE ETHER)-POLYSILOXANE COPOLYMER COMPOSITION

BACKGROUND OF THE INVENTION

Poly(phenylene ether) is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of consumer and industrial products, for example, plumbing fixtures, electrical boxes, automotive parts, and insulation for wire and cable.

Some parts made from poly(phenylene ether)-based compositions require high flame retardancy. Examples include fuser holders for electrophotographic copiers, fan blades, battery parts for hybrid and electric vehicles, parts for automotive kinetic energy recovery systems, and electric vehicle junction boxes. Poly(phenylene ether) is inherently flame retardant, but it is often blended with other components, such as impact modifiers and flow promoters, that reduce the flame retardancy of the resulting composition even as they improve its processing and mechanical properties. So, flame retardant additives are often required for blends of poly(phenylene ether)s with these other components.

Some molded parts require a flammability rating of V-0 in the 20 millimeter Vertical Burning Flame Test of Underwriter's Laboratory Bulletin 94 "Tests for Flammability of Plastic Materials, UL 94". This V-0 rating can be difficult to achieve in a poly(phenylene ether) composition, even when flame retardant concentration is increased, and concentrations of flammable components are decreased. And when the V-0 rating is achievable, it often comes at the expense of diminished heat resistance and diminished stiffness.

There remains a need for poly(phenylene ether)-containing parts that exhibit a UL 94 V-0 rating while maintaining high heat resistance and stiffness.

BRIEF SUMMARY OF EMBODIMENTS OF THE INVENTION

One embodiment is an article comprising a composition, wherein the article is selected from the group consisting of fuser holders for electrophotographic copiers, fan blades, battery parts for hybrid and electric vehicles, parts for automotive kinetic energy recovery systems, and electric vehicle junction boxes; wherein the composition comprises 0.5 to 85 weight percent of a poly(phenylene ether)-polysiloxane copolymer comprising a poly(phenylene ether)-polysiloxane block copolymer, a poly(phenylene ether)-polysiloxane graft copolymer, or a combination thereof; 5 to 25 weight percent of a flame retardant comprising an organophosphate ester, a phosphazene, or a combination thereof; and 10 to 35 weight percent of a reinforcing filler; wherein all weight percent values are based on the total weight of the composition; provided that when the article is a fuser holder, the composition comprises 2 to 10 weight percent of a poly(phenylene ether)-polysiloxane block copolymer reaction product comprising the a poly(phenylene ether)-polysiloxane block copolymer and a first a poly(phenylene ether), and further comprises 55 to 75 weight percent of a second poly(phenylene ether).

This and other embodiments are described in detail below.

DETAILED DESCRIPTION OF THE INVENTION

The present inventors have determined that parts (also referred to herein as "articles") fabricated from a composition containing specific amounts of a poly(phenylene ether)-polysiloxane copolymer, a flame retardant, and a reinforcing filler exhibit a UL 94 V-0 rating while maintaining high heat resistance and stiffness. In some embodiments, the high heat resistance is manifested as a heat deflection temperature of 110 to 180° C., specifically 130 to 170° C., determined according to ASTM D 648-07 using 6 4 millimeter thick bars, an edgewise test direction, a support span of 100 millimeters (Method B), a stress of 1.82 megapascals, a deflection of 0.25 millimeters at reading, and a heating rate of 2° C./minute. In some embodiments, the high stiffness is manifested as a flexural modulus of 3,500 to 7,000 megapascals, specifically 4,500 to 6,500 megapascals, determined at 23° C. according to ASTM D 790-07el using 6.4 millimeter thick bars, a support span of 101.6 millimeters, and a test speed of 2.54 millimeters/minute. In some embodiments, the composition exhibits high melt flow, which facilitates injection molding of parts. The high melt flow can be objectively manifested as a melt volume flow rate of 10 to 30 cubic centimeters per 10 minutes, specifically 10 to 25 cubic centimeters per 10 minutes, determined according to ASTM D 1238-04 at 300° C. using a load of 5 kilograms, automatic timing (Procedure B), a capillary diameter of 2.0955 millimeters, and a capillary length of 8.00 millimeters.

Examples of articles benefiting from the flame retardancy, heat resistance, and stiffness of the composition include fuser holders for electrophotographic copiers (including fuser gates, fuser covers, and fuser frames), fan blades (including blades in fans employed in computer and telecommunication equipment such as personal computers, servers, routers, and base stations; blades in fans employed in business equipment such as printers, copiers, faxes, and projectors; blades in fans employed in electrical appliances such as refrigerators, freezers, washing machines and driers, microwave ovens, dishwashers, air conditioners, and audiovisual equipment; and blades in fans used in industrial equipment, including robots), battery parts for hybrid and electric vehicles (including battery cases, battery module cases, battery terminal blocks, battery spacers, and battery trays), parts for automotive kinetic energy recovery systems (including battery module cases and capacitor cases), and electric vehicle junction boxes.

The composition comprises a poly(phenylene ether)-polysiloxane copolymer that comprises a poly(phenylene ether)-polysiloxane block copolymer, a poly(phenylene ether)-polysiloxane graft copolymer, or a combination thereof.

In some embodiments, the composition comprises a poly(phenylene ether)-polysiloxane copolymer. The poly(phenylene ether)-polysiloxane block copolymer comprises a poly(phenylene ether) block and a polysiloxane block. Included in poly(phenylene ether)-polysiloxane block copolymers are diblock copolymers comprising one poly(phenylene ether) block and one polysiloxane block; triblock copolymers comprising two poly(phenylene ether) blocks and one polysiloxane block, or one poly(phenylene ether) block and two polysiloxane blocks; and multiblock copolymers comprising at least two poly(phenylene ether) blocks and at least two polysiloxane blocks.

Poly(phenylene ether)-polysiloxane diblock and triblock copolymers can be synthesized by oxidative polymerization of a mixture of monohydric phenol and hydroxyaryl-terminated polysiloxane. This oxidative polymerization produces a poly(phenylene ether)-polysiloxane block copolymer reaction product that comprises poly(phenylene ether)-polysiloxane block copolymer as the desired product and poly(phenylene ether) as a by-product. This poly(phenylene ether) present in the reaction product is sometimes referred to herein as the "first poly(phenylene ether)" to distinguish it from a "second poly(phenylene ether)" that is optionally present in the composition and not derived from the poly(phenylene ether)-polysiloxane block copolymer reaction product. It is unnecessary to separate the first poly(phenylene ether) from the poly(phenylene ether)-polysiloxane block copolymer. The poly(phenylene ether)-polysiloxane block copolymer can therefore be incorporated into the present composition as the poly(phenylene ether)-polysiloxane block copolymer reaction product that comprises the first poly(phenylene ether) in addition to the poly(phenylene ether)-polysiloxane block copolymer.

When the poly(phenylene ether)-polysiloxane block copolymer is synthesized by oxidative polymerization of a mixture of monohydric phenol and hydroxyaryl-terminated polysiloxane, the poly(phenylene ether) block is a polymerization product of the monohydric phenol.

In some embodiments, the monohydric phenol has the structure

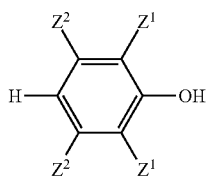

and the poly(phenylene ether) block comprises phenylene ether repeat units having the structure

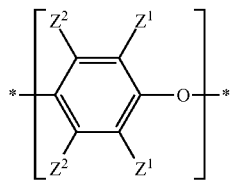

wherein for each repeating unit, each $Z^1$ is independently unsubstituted or substituted $C_1$-$C_{12}$ hydrocarbylthio, unsubstituted or substituted $C_1$-$C_{12}$ hydrocarbyloxy, or unsubstituted or substituted $C_1$-$C_{12}$ hydrocarbyl provided that the hydrocarbyl group is not tertiary hydrocarbyl; and each $Z^2$ is independently hydrogen, unsubstituted or substituted $C_1$-$C_{12}$ hydrocarbylthio, unsubstituted or substituted $C_1$-$C_{12}$ hydrocarbyloxy, or unsubstituted or substituted $C_1$-$C_{12}$ hydrocarbyl provided that the hydrocarbyl group is not tertiary hydrocarbyl. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. For example, when described as substituted, the hydrocarbyl residue can also contain one or more carbonyl groups, amino groups, hydroxyl groups, or it can contain heteroatoms within the backbone of the hydrocarbyl residue. As one example, $Z^1$ of the phenylene ether repeat unit can be a di-n-butylaminomethyl group formed by reaction of a terminal 3,5-dimethyl-1,4-phenyl group with the di-n-butylamine component of an oxidative polymerization catalyst. In some embodiments, the monohydric phenol comprises 2,6-dimethylphenol, 2,3,6-trimethylphenol, or a combination thereof, and the poly(phenylene ether) block comprises, respectfully, 2,6-dimethyl-1,4-phenylene ether repeat units, that is, repeat units having the structure

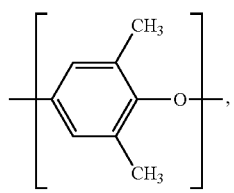

2,3,6-trimethyl-1,4-phenylene ether repeat units, or a combination thereof.

When the poly(phenylene ether)-polysiloxane block copolymer is synthesized by oxidative polymerization of a mixture of monohydric phenol and hydroxyaryl-terminated polysiloxane, the polysiloxane block is a residue of the hydroxyaryl-terminated polysiloxane. In some embodiments, the polysiloxane block comprises repeat units having the structure

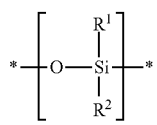

wherein each occurrence of $R^1$ and $R^2$ is independently hydrogen or $C_1$-$C_{12}$ hydrocarbyl; and the polysiloxane block further comprises a terminal unit having the structure

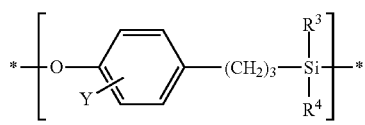

wherein Y is hydrogen, $C_1$-$C_{12}$ hydrocarbyl, or $C_1$-$C_{12}$ hydrocarbyloxy, and wherein each occurrence of $R^3$ and $R^4$ is independently hydrogen or $C_1$-$C_{12}$ hydrocarbyl. In some embodiments, the polysiloxane repeat units comprise dimethylsiloxane (—Si(CH$_3$)$_2$O—) units. In some embodiments, the polysiloxane block has the structure

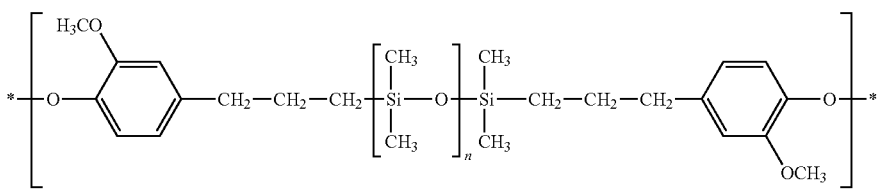

wherein n is 20 to 60.

In a very specific embodiment, the poly(phenylene ether)-polysiloxane block copolymer comprises a poly(phenylene ether) block comprising phenylene ether repeat units having the structure

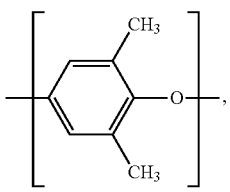

and
a polysiloxane block having the structure

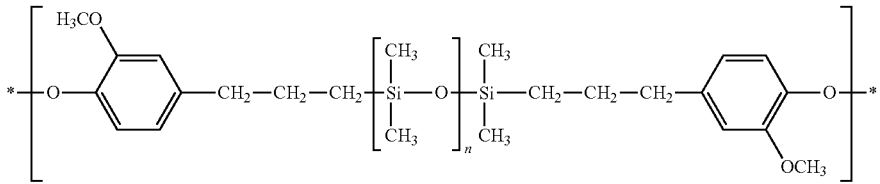

wherein n is 30 to 60.

The hydroxyaryl-terminated polysiloxane comprises at least one hydroxyaryl terminal group. In some embodiments, the hydroxyaryl-terminated polysiloxane has a single hydroxyaryl terminal group, in which case a poly(phenylene ether)-polysiloxane diblock copolymer is formed. In other embodiments, the hydroxyaryl-terminated polysiloxane has two hydroxyaryl terminal groups, in which case in which case poly(phenylene ether)-polysiloxane diblock copolymer and/or poly(phenylene ether)-polysiloxane-poly(phenylene ether) triblock copolymer are formed. It is also possible for the hydroxyaryl-terminated polysiloxane to have a branched structure that allows three or more hydroxyaryl terminal groups and the formation of corresponding branched block copolymers.

In a very specific procedure for preparing the poly(phenylene ether)-polysiloxane block copolymer reaction product, the monohydric phenol is 2,6-dimethylphenol; the hydroxyaryl-terminated polysiloxane is a eugenol-capped polydimethylsiloxane comprising 35 to 60 dimethylsiloxane units; the oxidative copolymerization is conducted with a reaction time of 170 to 220 minutes; and the hydroxyaryl-terminated polysiloxane constitutes 2 to 7 weight percent of the combined weight of the monohydric phenol and the hydroxyaryl-terminated polysiloxane.

In some embodiments, the hydroxyaryl-terminated polysiloxane comprises 20 to 80 siloxane repeat units, specifically 25 to 70 siloxane repeat units, more specifically 30 to 60 siloxane repeat units, still more specifically 35 to 50 siloxane repeat units, yet more specifically 40 to 50 siloxane repeat units. The number of siloxane repeat units in the polysiloxane block is essentially unaffected by the copolymerization and isolation conditions, and it is therefore equivalent to the number of siloxane repeat units in the hydroxyaryl-terminated polysiloxane starting material. When not otherwise known, the average number of siloxane repeat units per hydroxyaryl-terminated polysiloxane molecule can be determined by nuclear magnetic resonance (NMR) methods that compare the intensities of signals associated with the siloxane repeat units to those associated with the hydroxyaryl terminal groups. For example, when the hydroxyaryl-terminated polysiloxane is a eugenol-capped polydimethylsiloxane, it is possible to determine the average number of siloxane repeat units by a proton nuclear magnetic resonance ($^1$H NMR) method in which integrals for the protons of the dimethylsiloxane resonance and the protons of the eugenol methoxy group are compared.

In some embodiments, the poly(phenylene ether)-polysiloxane block copolymer reaction product has a weight average molecular weight of at least 30,000 atomic mass units. For example, the reaction product can have a weight average molecular weight of 30,000 to 150,000 atomic mass units, specifically 35,000 to 120,000 atomic mass units, more specifically 40,000 to 90,000 atomic mass units, even more specifically 45,000 to 70,000 atomic mass units. In some embodiments, the poly(phenylene ether)-polysiloxane block copolymer reaction product has a number average molecular weight of 10,000 to 50,000 atomic mass units, specifically 10,000 to 30,000 atomic mass units, more specifically 14,000 to 24,000 atomic mass units.

In some embodiments, the poly(phenylene ether)-polysiloxane block copolymer reaction product has an intrinsic viscosity of at least 0.3 deciliter per gram, as measured by Ubbelohde viscometer at 25° C. in chloroform. In some embodiments, the intrinsic viscosity is 0.3 to 0.5 deciliter per gram, specifically 0.31 to 0.5 deciliter per gram, more specifically 0.35 to 0.47 deciliter per gram.

One indication of the efficiency with which the hydroxyaryl-terminated polysiloxane is incorporated into block copolymer is the low concentration of so-called poly(phenylene ether) "tail" groups in the reaction product. In a homopolymerization of 2,6-dimethylphenol, a large fraction of product molecules have a so-called head-to-tail structure in which the linear product molecule is terminated on one end by a 3,5-dimethyl-4-hydroxyphenyl "head" and on the other end by a 2,6-dimethylphenoxy "tail". Thus, when the monohydric phenol consists of 2,6-dimethylphenol, the poly(phenylene ether) tail group has the structure

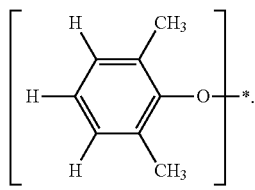

Note that the term "2,6-dimethylphenoxy" refers to a monovalent group and does not encompass divalent 2,6-dimethyl-1,4-phenylene ether groups. In a copolymerization of monohydric phenol with hydroxyaryl-terminated polysiloxane, incorporation of the hydroxyaryl-terminated polysiloxane into block copolymer will reduce the concentration of phenylene ether "tail" groups. Thus, in some embodiments, the monohydric phenol consists of 2,6-dimethylphenol, and the reaction product of comprises less than or equal to 0.4 weight percent, specifically 0.1 to 0.4 weight percent, of 2,6-dimethylphenoxy groups, based on the weight of the reaction product. The low concentration of 2,6-dimethylphenoxy tail end groups is an indication that the reaction product comprises a reduced concentration of the 2,6-dimethylphenol homopolymer and an increased concentration of the desired poly(phenylene ether)-polysiloxane block copolymer.

The poly(phenylene ether)-polysiloxane block copolymer reaction product can further include groups derived from a diphenoquinone, which is itself an oxidation product of the monohydric phenol. For example, when the monohydric phenol is 2,6-dimethylphenol, the diphenoquinone is 3,3',5,5'-tetramethyl-4,4'-diphenoquinone. During the build phase of the copolymerization, the diphenoquinone is typically incorporated into the "tail" end of a head-to-tail poly(phenylene ether) as the corresponding biphenyl group. Through further reactions, the terminal biphenyl group can become an internal biphenyl group in the first poly(phenylene ether) chain. In some embodiments, the monohydric phenol consists of 2,6-dimethylphenol, and the reaction product comprises 0.1 to 2.0 weight percent, and specifically 1.1 to 2.0 weight percent, of 2,6-dimethyl-4-(3,5-dimethyl-4-hydroxyphenyl)-phenoxy ("biphenyl") groups. The biphenyl groups are present only in bifunctional (head-to-head or hydroxyl-diterminated) structure. So, the low concentration of biphenyl group is an indication that the reaction product comprises a reduced concentration of such bifunctional 2,6-dimethylphenol homopolymer and an increased concentration of the desired poly(phenylene ether)-polysiloxane block copolymer.

The poly(phenylene ether)-polysiloxane block copolymer content of a poly(phenylene ether)-polysiloxane block copolymer reaction product can be estimated by nuclear magnetic resonance spectroscopy (NMR). For example, when the monohydric phenol is 2,6-dimethylphenol, and the hydroxylaryl-terminated polysiloxane is a eugenol-diterminated polydimethylsiloxane, the reaction product can be approximated as a mixture of head-to-tail poly(phenylene ether) homopolymer, head-to-head poly(phenylene ether) homopolymer (incorporating a biphenyl group), and poly (phenylene ether)-polysiloxane-poly(phenylene ether) triblock copolymer. Nuclear magnetic resonance analysis of the mixture can be used to determine the relative concentrations of "head groups" having the structure

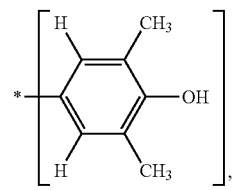

"tail groups" having the structure

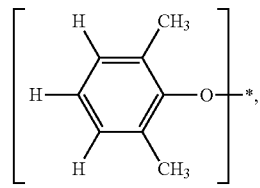

and
"biphenyl groups" having the structure

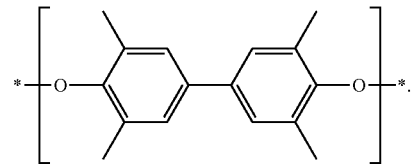

The concentration of poly(phenylene ether)-polysiloxane-poly(phenylene ether) triblock copolymer (PSP) can then be calculated as PSP=½([head groups]−[tail groups]−2[biphenyl groups]).

In some embodiments, the poly(phenylene ether)-polysiloxane block copolymer reaction product incorporates greater than 75 weight percent, of the hydroxyaryl-terminated polysiloxane starting material into the poly(phenylene ether)-polysiloxane block copolymer. Specifically, the amount of the hydroxyaryl-terminated polysiloxane incorporated into the poly(phenylene ether)-polysiloxane block copolymer can be at least 80 weight percent, more specifically at least 85 weight percent, still more specifically at least 90 weight percent, yet more specifically at least 95 weight percent.

Details relating to the preparation, characterization, and properties of the poly(phenylene ether)-polysiloxane block copolymer reaction product can be found in U.S. Pat. Nos. 8,017,697, 8,669,332, and 8,722,837 to Carrillo et al.

In addition to the oxidative copolymerization method described above, a polyesterification method can be used to form the poly(phenylene ether)-polysiloxane block copolymer. When the polyesterification method is used, the product is a multiblock copolymer comprising at least two poly(phenylene ether) blocks and at least two polysiloxane blocks. Thus, in some embodiments, the poly(phenylene ether)-polysiloxane block copolymer comprises a poly(phenylene ether)-polysiloxane multiblock copolymer that is the product of copolymerizing a hydroxy-diterminated poly(phenylene ether), a hydroxyaryl-diterminated polysiloxane, and an aromatic diacid chloride.

The hydroxy-diterminated poly(phenylene ether) can have the structure

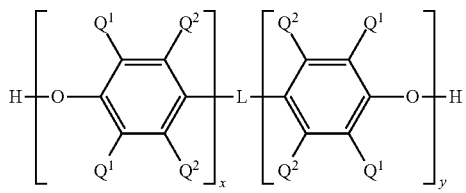

wherein x and y are each independently 0 to about 100, provided that the sum of x and y is at least 2; each occurrence of $Q^1$ is independent selected from the group consisting of halogen, unsubstituted or substituted $C_1$-$C_{12}$ hydrocarbylthio, unsubstituted or substituted $C_1$-$C_{12}$ hydrocarbyloxy, unsubstituted or substituted $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; each occurrence of $Q^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; and L has the structure

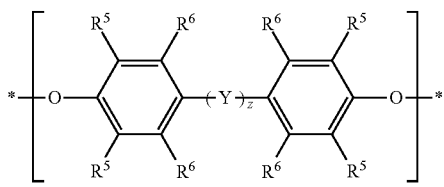

wherein each occurrence of $R^5$ and $R^6$ is independently selected from the group consisting of hydrogen, halogen, unsubstituted or substituted $C_1$-$C_{12}$ hydrocarbylthio, unsubstituted or substituted $C_1$-$C_{12}$ hydrocarbyloxy, unsubstituted or substituted $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; z is 0 or 1; and Y has a structure selected from the group consisting of

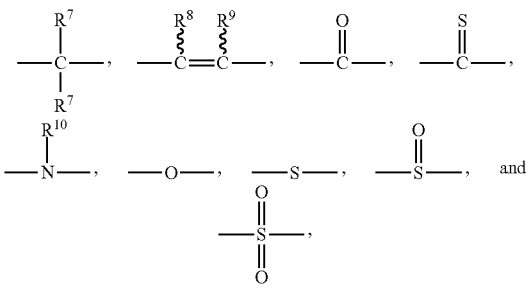

wherein each occurrence of $R^7$-$R^{10}$ is independently hydrogen or $C_1$-$C_{12}$ hydrocarbyl.

In some embodiments, the hydroxy-diterminated poly(phenylene ether) has the structure

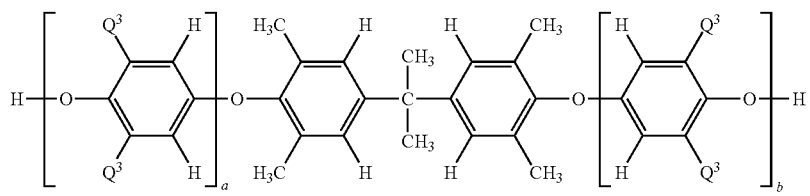

wherein each occurrence of $Q^3$ is independently methyl or di-n-butylaminomethyl; and each occurrence of a and b is independently 0 to about 100, provided that the sum of a and b is 3 to 100. In some embodiments, the sum of a and b is 4 to 30.

The aromatic diacid chloride used in the polyesterification method can be, for example, terephthaloyl chloride, isophthaloyl chloride, 4,4'-biphenyldicarbonyl chloride, 3,3'-biphenyldicarbonyl chloride, 3,4'-biphenyldicarbonyl chloride, 4,4'-oxybis(benzoyl chloride), 3,3'-oxybis(benzoyl chloride), 3,4'-oxybis(benzoyl chloride), 4,4'-sulfonylbis(benzoyl chloride), 3,3'-sulfonylbis(benzoyl chloride), 3,4'-sulfonylbis(benzoyl chloride), naphthalene-2,6-dicarbonyl chloride, or a mixture thereof. In some embodiments, the aromatic diacid chloride comprises terephthaloyl chloride.

As noted above, when the poly(phenylene ether)-polysiloxane multiblock copolymer is prepared by the polyesterification method, it comprises at least two poly(phenylene ether) blocks and at least two polysiloxane blocks. However, it can contain many more of each type of block. For example, in some embodiments, the poly(phenylene ether)-polysiloxane multiblock copolymer comprises about 5 to about 25 poly(phenylene ether) blocks and about 10 to about 30 polysiloxane blocks.

Additional details relating to the polyesterification method and the poly(phenylene ether)-polysiloxane multiblock copolymer prepared thereby can be found in U.S. Pat. No. 8,309,665 B2 to Kamalakaran et al. An alternative method of forming poly(phenylene ether)-polysiloxane multiblock copolymers is described in Cella et al., The poly(phenylene ether)-polysiloxane copolymer can include a poly(phenylene ether)-polysiloxane graft copolymer. A poly(phenylene ether)-polysiloxane graft copolymer comprises a poly(phenylene ether) backbone and at least one polysiloxane graft at an internal (not terminal) phenylene ether unit of the poly(phenylene ether) backbone. Poly(phenylene ether)-polysiloxane graft copolymers can be prepared by oxidative copolymerization of a monohydric phenol, as defined above, and a phenol-polysiloxane macromer having the structure

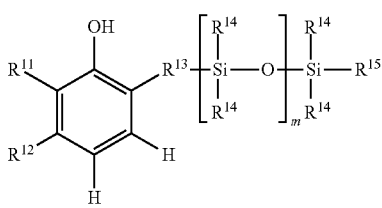

wherein $R^{11}$ is halogen, unsubstituted or substituted $C_1$-$C_{12}$ hydrocarbylthio, unsubstituted or substituted $C_1$-$C_{12}$ hydrocarbyloxy, unsubstituted or substituted $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; $R^{12}$ is hydrogen, halogen, unsubstituted or substituted $C_1$-$C_{12}$ hydrocarbylthio, unsubstituted or substituted $C_1$-$C_{12}$ hydrocarbyloxy, unsubstituted or substituted $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; $R^{13}$ is $C_2$-$C_{20}$ hydrocarbylene; each occurrence of $R^{14}$ is independently hydrogen or $C_1$-$C_{12}$ hydrocarbyl; $R^{15}$ is $C_1$-$C_{12}$ hydrocarbyl; and m is 3 to 100. In a specific embodiment, the monohydric phenol is 2,6-dimethylphenol, and in the phenol-polysiloxane macromer, $R^{11}$ is methyl, $R^{12}$ is hydrogen, $R^{13}$ is trimethylene (—$CH_2$—$CH_2$—$CH_2$—), each occurrence of $R^{14}$ is methyl, $R^{15}$ is methyl, and m is 20 to 60. In some embodiments, the molar ratio of monohydric phenol to phenol-polysiloxane macromere is 10:1 to 1000:1, specifically 20:1 to 100:1 during the oxidative copolymerization. In some embodiments, the weight percent siloxane in the poly(phenylene ether)-polysiloxane graft copolymer is 0.5 to 10 weight percent, specifically 1 to 8 weight percent. Additional details relating to poly(phenylene ether)-polysiloxane graft copolymers prepared by oxidative copolymerization can be found in U.S. Pat. No. 5,281,686 to Blohm et al. Poly(phenylene ether)-polysiloxane graft copolymers can also be prepared by redistribution of a poly(phenylene ether) in the presence of a hydroxyaryl-terminated polysiloxane. This procedure is described in U.S. Pat. No. 5,596,048 to Blohm et al.

The composition can comprise a mixture of a poly(phenylene ether)-polysiloxane block copolymer and a poly(phenylene ether)-polysiloxane graft copolymer.

In some embodiments, the composition comprises 0.025 to 5 weight percent of polysiloxane covalently bound in the poly(phenylene ether)-polysiloxane copolymer. In other words, the poly(phenylene ether)-polysiloxane copolymer contributes 0.025 to 5 weight percent of polysiloxane to the composition as a whole. In some embodiments, the covalently bound polysiloxane amount is 0.025 to 2 weight percent, specifically 0.05 to 1 weight percent, based on the total weight of the composition. In other embodiments, the covalently bound polysiloxane amount is 1 to 6 weight percent, specifically 2 to 4 weight percent, based on the total weight of the composition. In some embodiments, the polysiloxane content of the composition consists essentially of polysiloxane that has been incorporated into the poly(phenylene ether)-polysiloxane copolymer. In some embodiments, the poly(phenylene ether)-polysiloxane copolymer comprises 1 to 8 weight percent siloxane repeat units and 12 to 99 weight percent phenylene ether repeat units, based on the total weight of the poly(phenylene ether)-polysiloxane copolymer. Within these ranges, the amount of siloxane repeat units can be 2 to 7 weight percent, specifically 3 to 6 weight percent, more specifically 4 to 5 weight percent; and the amount of phenylene ether repeat units can be 93 to 98 weight percent, specifically 94 to 97 weight percent, more specifically 95 to 96 weight percent.

The poly(phenylene ether)-polysiloxane copolymer can include relatively small amounts of very low molecular weight species. Thus, in some embodiments, the poly(phenylene ether)-polysiloxane copolymer comprises less than 25 weight percent of molecules having a molecular weight less than 10,000 atomic mass units, specifically 5 to 25 weight percent of molecules having a molecular weight less than 10,000 atomic mass units, more specifically 7 to 21 weight percent of molecules having a molecular weight less than 10,000 atomic mass units. In some embodiments, the molecules having a molecular weight less than 10,000 atomic mass units comprise 5 to 10 weight percent siloxane repeat units, specifically 6 to 9 weight percent siloxane repeat units.

Similarly, the poly(phenylene ether)-polysiloxane copolymer can also include relatively small amounts of very high molecular weight species. Thus, in some embodiments, the poly(phenylene ether)-polysiloxane copolymer comprises less than 25 weight percent of molecules having a molecular weight greater than 100,000 atomic mass units, specifically 5 to 25 weight percent of molecules having a molecular weight greater than 100,000 atomic mass units, more specifically 7 to 23 weight percent of molecules having a molecular weight greater than 100,000 atomic mass units. In some embodiments, the molecules having a molecular weight greater than 100,000 atomic mass units comprise 3 to 6 weight percent siloxane repeat units, specifically 4 to 5 weight percent siloxane repeat units.

The composition comprises 0.5 to 85 weight percent of the poly(phenylene ether)-polysiloxane copolymer, based on the total weight of the composition. In some embodiments, the poly(phenylene ether)-polysiloxane copolymer amount is 1 to 20 weight percent, specifically 2 to 10 weight percent. In other embodiments, the poly(phenylene ether)-polysiloxane copolymer amount is 30 to 85 weight percent, specifically 40 to 75 weight percent, more specifically 53 to 63 weight percent.

In some embodiments, particularly those in which the amount of the poly(phenylene ether)-polysiloxane copolymer is less than 50 weight percent, it can be beneficial to include a second poly(phenylene ether) in the composition. As used herein, the term "second poly(phenylene ether)" refers to a poly(phenylene ether) that is not derived from the poly(phenylene ether)-polysiloxane block copolymer reaction. The second poly(phenylene ether) can be chemically the same as or different from the first poly(phenylene ether). Suitable first and second poly(phenylene ether)s include those comprising repeating structural units having the formula

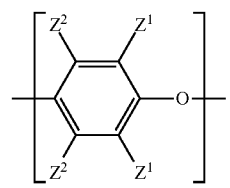

wherein each occurrence of $Z^1$ is independently halogen, unsubstituted or substituted $C_1$-$C_{12}$ hydrocarbylthio, unsubstituted or substituted $C_1$-$C_{12}$ hydrocarbyloxy, unsubstituted or substituted $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; and each occurrence of $Z^2$ is independently hydrogen, halogen, unsubstituted or substituted $C_1$-$C_{12}$ hydrocarbylthio, unsubstituted or substituted $C_1$-$C_{12}$ hydrocarbyloxy, unsubstituted or substituted $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl.

In some embodiments, the second poly(phenylene ether) has an intrinsic viscosity of 0.2 to 1 deciliter per gram measured by Ubbelohde viscometer at 25° C. in chloroform. Within this range, the second poly(phenylene ether) intrinsic viscosity can be 0.2 to 0.5 deciliter per gram, specifically 0.2 to 0.4 deciliter per gram, still more specifically 0.25 to 0.35 deciliter per gram.

In some embodiments, the second poly(phenylene ether) comprises 2,6-dimethyl-1,4-phenylene ether units, 2,3,6-trimethyl-1,4-phenylene ether units, or a combination thereof. In some embodiments, the second poly(phenylene ether) comprises a poly(2,6-dimethyl-1,4-phenylene ether). In some embodiments, the second poly(phenylene ether) comprises a poly(2,6-dimethyl-1,4-phenylene ether) having an intrinsic viscosity of 0.2 to 0.4 deciliter per gram, specifically 0.25 to 0.35 deciliter per gram, measured by Ubbelohde viscometer at 25° C. in chloroform.

When present, the second poly(phenylene ether) can be used in an amount of 5 to 84.5 weight percent, specifically 20 to 80 weight percent, more specifically 55 to 75 weight percent, based on the total weight of the composition.

In addition to the poly(phenylene ether)-polysiloxane copolymer and the optional second poly(phenylene ether), the composition comprises a flame retardant. The flame retardant comprises an organophosphate ester, a phosphazene, or a combination thereof.

In some embodiments, the flame retardant comprises an organophosphate ester. Exemplary organophosphate ester flame retardants include phosphate esters comprising phenyl groups, substituted phenyl groups, or a combination of phenyl groups and substituted phenyl groups, bis(aryl phosphate) esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol
A bis(diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), and combinations thereof.

In some embodiments the organophosphate ester comprises a bis(aryl phosphate) having the formula

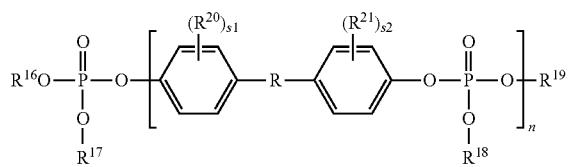

wherein R is independently at each occurrence a $C_1$-$C_{12}$ alkylene group; $R^{20}$ and $R^{21}$ are independently at each occurrence a $C_1$-$C_5$ alkyl group; $R^{16}$, $R^{17}$, and $R^{19}$ are independently a $C_1$-$C_{12}$ hydrocarbyl group; $R^{18}$ is independently at each occurrence a $C_1$-$C_{12}$ hydrocarbyl group; n is 1 to 25; and s1 and s2 are independently an integer equal to 0, 1, or 2. In some embodiments $OR^{16}$, $OR^{17}$, $OR^{18}$ and $OR^{19}$ are independently derived from phenol, a monoalkylphenol, a dialkylphenol, or a trialkylphenol.

As readily appreciated by one of ordinary skill in the art, the bis(aryl phosphate) is derived from a bisphenol. Exemplary bisphenols include 2,2-bis(4-hydroxyphenyl)propane (bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxypheny)ethane. In some embodiments, the bisphenol comprises bisphenol A.

In some embodiments, the flame retardant comprises a phosphazene. A phosphazene is a compound comprising repeat units having the structure

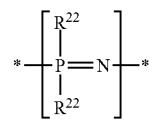

wherein each occurrence of $R^{22}$ is independently $C_1$-$C_6$ alkoxy, unsubstituted or substituted phenoxy, or unsubstituted or substituted naphthyloxy. When present, the substituents on the phenoxy or naphthyloxy groups can be, for example, $C_1$-$C_6$ alkyl, $C_1$-$C_6$ alkoxy, or phenyl.

In some embodiments, the phosphazene comprises a cyclic oligophosphazene having the structure

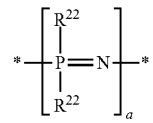

wherein $R^{22}$ is defined above and a is 3 to 12, specifically 3 to 6. In some embodiments, a is 3 and each occurrence of $R^{22}$ is unsubstituted phenoxy.

In some embodiments, the phosphazene comprises a linear oligophosphazene or polyphosphazene having the structure

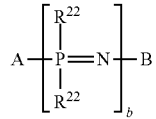

wherein $R^{22}$ is defined above; b is 3 to 1,000; A is —N=P(O)($R^{22}$) or —N=P($R^{22}$)$_3$; and B is —P($R^{22}$)$_4$ or —P(O)($R^{22}$)$_2$.

The phosphazene can be a crosslinked polyphosphazene comprising a phenylene group, a biphenylene group, or a group having the structure

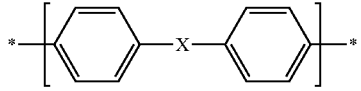

wherein X is $C_1$-$C_6$ alkylidene, O, S, or $SO_2$. This crosslinking group is typically directly bonded at each end to a phosphazene phosphorus atom.

A mixture of at least two of cyclic oligophosphazenes, linear oligophosphazenes, linear polyphosphazenes, and crosslinked phosphazenes can be used. In some embodiments, the phosphazene comprises at last 80 weight percent cyclic phosphazenes, based on the weight of the phosphazene.

Methods for making phosphazenes are known, and phosphazenes are commercially available as, for example, RABITLE™ FP-100 and RABITLE™ FP-110 from Fushimi Pharmaceutical Co., Ltd.; and IDB-Poretar-201 from ID-Biochem, and SPB-100 from Otsuka Chemical Company.

In addition to the organophosphate ester, the phosphazene, or the combination thereof, the flame retardant can, optionally, further comprise a metal dialkylphosphinate, a nitrogen-containing flame retardant, a metal hydroxide, or a combination thereof.

As used herein, the term "metal dialkylphosphinate" refers to a salt comprising at least one metal cation and at least one dialkylphosphinate anion. In some embodiments, the metal dialkylphosphinate has the formula

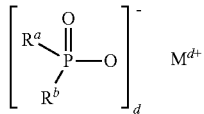

wherein $R^a$ and $R^b$ are each independently $C_1$-$C_6$ alkyl; M is calcium, magnesium, aluminum, or zinc; and d is 2 or 3. Examples of $R^a$ and $R^b$ include methyl, ethyl, n-propyl, isopropyl, n-butyl, tert-butyl, and n-pentyl. In some embodiments, $R^a$ and $R^b$ are ethyl, M is aluminum, and d is 3 (that is, the metal dialkylphosphinate is aluminum tris(diethylphosphinate)).

In some embodiments, the metal dialkylphosphinate is in particulate form. The metal dialkylphosphinate particles may have a median particle diameter (D50) less than or equal to 40 micrometers, or, more specifically, a D50 less than or equal to 30 micrometers, or, even more specifically, a D50 less than or equal to 25 micrometers. Additionally, the metal dialkylphosphinate may be combined with a polymer, such as the poly(phenylene ether)-polysiloxane block copolymer reaction product, the optional second poly(phenylene ether), or the optional impact modifier, to form a masterbatch. The metal dialkylphosphinate masterbatch comprises the metal dialkylphosphinate in an amount greater than is present in the thermoplastic composition. Employing a masterbatch for the addition of the metal dialkylphosphinate to the other components of the composition can facilitate addition and improve distribution of the metal dialkylphosphinate.

Nitrogen-containing flame retardants include those comprising a nitrogen-containing heterocyclic base and a phosphate or pyrophosphate or polyphosphate acid. In some embodiments, the nitrogen-containing flame retardant has the formula

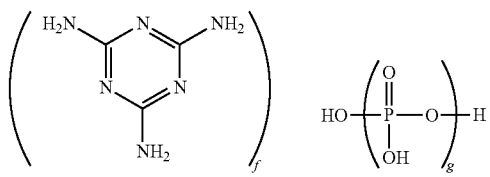

wherein g is 1 to 10,000, and the ratio of f to g is 0.5:1 to 1.7:1, specifically 0.7:1 to 1.3:1, more specifically 0.9:1 to 1.1:1. It will be understood that this formula includes species in which one or more protons are transferred from the phosphate group(s) to the melamine group(s). When g is 1, the nitrogen-containing flame retardant is melamine phosphate (CAS Reg. No. 20208-95-1). When g is 2, the nitrogen-containing flame retardant is melamine pyrophosphate (CAS Reg. No. 15541 60-3). When g is, on average, greater than 2, the nitrogen-containing flame retardant is a melamine polyphosphate (CAS Reg. No. 56386-64-2). In some embodiments, the nitrogen-containing flame retardant is melamine pyrophosphate, melamine polyphosphate, or a mixture thereof. In some embodiments in which the nitrogen-containing flame retardant is melamine polyphosphate, g has an average value of greater than 2 to 10,000, specifically 5 to 1,000, more specifically 10 to 500. In some embodiments in which the nitrogen-containing flame retardant is melamine polyphosphate, g has an average value of greater than 2 to 500. Methods for preparing melamine phosphate, melamine pyrophosphate, and melamine polyphosphate are known in the art, and all are commercially available. For example, melamine polyphosphates may be prepared by reacting polyphosphoric acid and melamine, as described, for example, in U.S. Pat. No. 6,025,419 to Kasowski et al., or by heating melamine pyrophosphate under nitrogen at 290° C. to constant weight, as described in U.S. Pat. No. 6,015,510 to Jacobson et al. In some embodiments, the nitrogen-containing flame retardant comprises melamine cyanurate.

The nitrogen-containing flame retardant can have a low volatility. For example, in some embodiments, the nitrogen-containing flame retardant exhibits less than 1 percent weight loss by thermogravimetric analysis when heated at a rate of 20° C. per minute from 25 to 280° C., specifically 25 to 300° C., more specifically 25 to 320° C.

Suitable metal hydroxides include all those capable of providing fire retardancy, as well as combinations of such metal hydroxides. The metal hydroxide can be chosen to have substantially no decomposition during processing of the fire additive composition and/or flame retardant thermoplastic composition. Substantially no decomposition is defined herein as amounts of decomposition that do not prevent the flame retardant additive composition from providing the desired level of fire retardancy. Exemplary metal hydroxides include, but are not limited to, magnesium hydroxide (for example, CAS Reg. No. 1309-42-8), aluminum hydroxide (for example, CAS Reg. No. 21645-51-2), cobalt hydroxide (for example, CAS Reg. No. 21041-93-0), and combinations thereof. In some embodiments, the metal hydroxide comprises magnesium hydroxide. In some embodiments the metal hydroxide has an average particle size less than or equal to 10 micrometers and/or a purity greater than or equal to 90 weight percent. In some embodiments it is desirable for the metal hydroxide to contain substantially no water, for example as evidenced by a weight loss of less than 1 weight percent upon drying at 120° C. for 1 hour. In some embodiments the metal hydroxide can be coated, for example, with stearic acid or other fatty acid.

The amount of the flame retardant can be 5 to 25 weight percent, based on the total weight of the composition. In some embodiments, the amount of the flame retardant is 5 to 20 weight percent, specifically 5 to 15 weight percent. In other embodiments, the amount of the flame retardant is 10 to 25 weight percent, specifically 15 to 25 weight percent.

In addition to the poly(phenylene ether)-polysiloxane block copolymer reaction product, the optional second poly(phenylene ether), and the flame retardant, the composition comprises a reinforcing filler. Reinforcing fillers include, for example, glass fibers, carbon fibers, wollastonite, halloysite, clays, talcs, micas, glass flakes, solid glass beads, hollow glass beads, solid ceramic beads, hollow ceramic beads, and combinations thereof. In some embodiments, the reinforcing filler comprises or consists of glass fibers.

Suitable glass fibers include those based on E, A, C, ECR, R, S, D, and NE glasses, as well as quartz. In some embodiments, the glass fiber has a diameter of 2 to 30 micrometers, specifically 5 to 25 micrometers, more specifically 10 to 15 micrometers. In some embodiments, the length of the glass fibers before compounding is 2 to 7 millimeters, specifically 3 to 5 millimeters. Suitable glass fiber is commercially available from suppliers including, for example, Owens Corning, Nippon Electric Glass, PPG, and Johns Manville.

The reinforcing filler can, optionally, include an adhesion promoter to improve its compatibility with the poly(phenylene ether)-polysiloxane block copolymer reaction product. Adhesion promoters include chromium complexes, silanes, titanates, zircoaluminates, propylene maleic anhydride copolymers, reactive cellulose esters, and the like.

The reinforcing filler can be used in an amount of 10 to 35 weight percent, based on the total weight of the composition. In some embodiments, the reinforcing filler amount is 10 to 25 weight percent, specifically 10 to 20 weight percent. In other embodiments, the reinforcing filler amount is 15 to 30 weight percent, specifically 15 to 25 weight percent.

The composition can, optionally, further include an impact modifier Impact modifiers include, for example, rubber-modified polystyrenes, unhydrogenated block copolymers of an alkenyl aromatic monomer and a conjugated diene, hydrogenated block copolymers of an alkenyl aromatic monomer and a conjugated diene, acrylate core-shell impact modifiers (e.g., those having a crosslinked poly(butyl acrylate) core and a grafted poly(methyl methacrylate) shell), and combinations thereof.

The impact modifier can include a rubber-modified polystyrene. Rubber-modified polystyrene comprises polystyrene and polybutadiene. Rubber-modified polystyrenes are sometimes referred to as "high-impact polystyrenes" or "HIPS". In some embodiments, the rubber-modified polystyrene comprises 80 to 96 weight percent polystyrene, specifically 88 to 94 weight percent polystyrene; and 4 to 20 weight percent polybutadiene, specifically 6 to 12 weight percent polybutadiene, based on the weight of the rubber-modified polystyrene. Suitable rubber-modified polystyrenes are commercially available as, for example, HIPS3190 from SABIC Innovative Plastics.

The impact modifier can include an unhydrogenated block copolymer of an alkenyl aromatic compound and a conjugated diene. For brevity, this component is referred to as an "unhydrogenated block copolymer". The unhydrogenated block copolymer can comprise 10 to 90 weight percent of poly(alkenyl aromatic) content and 90 to 10 weight percent of poly(conjugated diene) content, based on the weight of the unhydrogenated block copolymer. In some embodiments, the unhydrogenated block copolymer is a low poly(alkenyl aromatic content) unhydrogenated block copolymer in which the poly(alkenyl aromatic) content is 10 to less than 40 weight percent, specifically 20 to 35 weight percent, more specifically 25 to 35 weight percent, yet more specifically 30 to 35 weight percent, all based on the weight of the low poly(alkenyl aromatic) content unhydrogenated block copolymer. In other embodiments, the unhydrogenated block copolymer is a high poly(alkenyl aromatic) content unhydrogenated block copolymer in which the poly(alkenyl aromatic) content is 40 to 90 weight percent, specifically 50 to 80 weight percent, more specifically 60 to 70 weight percent, all based on the weight of the high poly(alkenyl aromatic) content unhydrogenated block copolymer.

In some embodiments, the unhydrogenated block copolymer has a weight average molecular weight of 40,000 to 400,000 atomic mass units. The number average molecular weight and the weight average molecular weight can be determined by gel permeation chromatography and based on comparison to polystyrene standards. In some embodiments, the unhydrogenated block copolymer has a weight average molecular weight of 200,000 to 400,000 atomic mass units, specifically 220,000 to 350,000 atomic mass units. In other embodiments, the unhydrogenated block copolymer has a weight average molecular weight of 40,000 to 200,000 atomic mass units, specifically 40,000 to 180,000 atomic mass units, more specifically 40,000 to 150,000 atomic mass units.

The alkenyl aromatic monomer used to prepare the unhydrogenated block copolymer can have the structure

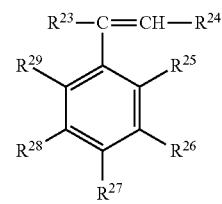

wherein $R^{23}$ and $R^{24}$ each independently represent a hydrogen atom, a $C_1$-$C_8$ alkyl group, or a $C_2$-$C_8$ alkenyl group; $R^{25}$ and $R^{29}$ each independently represent a hydrogen atom, a $C_1$-$C_8$ alkyl group, a chlorine atom, or a bromine atom; and $R^{26}$, $R^{27}$, and $R^{28}$ each independently represent a hydrogen atom, a $C_1$-$C_8$ alkyl group, or a $C_2$-$C_8$ alkenyl group, or $R^{26}$ and $R^{27}$ are taken together with the central aromatic ring to form a naphthyl group, or $R^{27}$ and $R^{28}$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the unhydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and combinations thereof. In some embodiments, the conjugated diene is 1,3-butadiene, 2-methyl-1,3-butadiene, or a combination thereof. In some embodiments, the conjugated diene consists of 1,3-butadiene.

The unhydrogenated block copolymer is a copolymer comprising (A) at least one block derived from an alkenyl aromatic compound and (B) at least one block derived from a conjugated diene. The arrangement of blocks (A) and (B) includes a linear structure, a grafted structure, and a radial teleblock structure with or without a branched chain. Linear block copolymers include tapered linear structures and non-tapered linear structures. In some embodiments, the unhydrogenated block copolymer has a tapered linear structure. In some embodiments, the unhydrogenated block copolymer has a non-tapered linear structure. In some embodiments, the unhydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the unhydrogenated block copolymer is a diblock copolymer, a triblock copolymer, or a combination thereof.

In some embodiments, the unhydrogenated block copolymer excludes the residue of monomers other than the alkenyl aromatic compound and the conjugated diene. In some embodiments, the unhydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms.

In some embodiments, the unhydrogenated block copolymer includes the residue of one or more acid functionalizing agents, such as maleic anhydride.

In some embodiments, the unhydrogenated block copolymer comprises a polystyrene-polybutadiene-polystyrene triblock copolymer. In some embodiments, the unhydrogenated block copolymer comprises a polystyrene-polyisoprene-polystyrene triblock copolymer.

Methods for preparing unhydrogenated block copolymers are known in the art and unhydrogenated block copolymers are commercially available. Illustrative commercially available unhydrogenated block copolymers include the polystyrene-polybutadiene-polystyrene triblock copolymers from Kraton Performance Polymers Inc. under the trade names Kraton™ D1101 and D1102; and the styrene-butadiene radial teleblock copolymers from Chevron Phillips Chemical Company under the trade names K-RESIN™ KK38, KR01, KR03, and KR05.

The impact modifier can be a hydrogenated block copolymer of an alkenyl aromatic compound and a conjugated diene. For brevity, this component is referred to as a "hydrogenated block copolymer". The hydrogenated block copolymer is the same as the unhydrogenated block copolymer, except that in the hydrogenated block copolymer the aliphatic unsaturated group content in the block (B) derived from a conjugated diene has been at least partially reduced by hydrogenation. In some embodiments, the aliphatic unsaturation in the (B) block is reduced by at least 50 percent, specifically at least 70 percent, more specifically at least 90 percent.

Illustrative commercially available hydrogenated block copolymers include the polystyrene-poly(ethylene-propylene) diblock copolymers available from Kraton Performance Polymers Inc. as KRATON™ G1701 and G1702; the polystyrene-poly(ethylene-butylene)-polystyrene triblock copolymers available from Kraton Performance Polymers Inc. as KRATON™ G1641, G1650, G1651, G1654, G1657, G1726, G4609, G4610, GRP-6598, MD-6932M, MD-6933, and MD-6939; the polystyrene-poly(ethylene-propylene)-polystyrene triblock copolymers available from Kraton Performance Polymers Inc. as KRATON™ G1730; the maleic anhydride-grafted polystyrene-poly(ethylene-butylene)-polystyrene triblock copolymers available from Kraton Performance Polymers Inc. as KRATON™ G1901, G1924, and MD-6684; the maleic anhydride-grafted polystyrene-poly (ethylene-butylene-styrene)-polystyrene triblock copolymer available from Kraton Performance Polymers Inc. as KRATON™ MD-6670; the polystyrene-poly(ethylene-butylene)-polystyrene triblock copolymer comprising 67 weight percent polystyrene available from Asahi Kasei Elastomer as TUFTEC™ H1043; the polystyrene-poly(ethylene-butylene)-polystyrene triblock copolymer comprising 42 weight percent polystyrene available from Asahi Kasei Elastomer as TUFTEC™ H1051; the polystyrene-poly(butadiene-butylene)-polystyrene triblock copolymers available from Asahi Kasei Elastomer as TUFTEC™ P1000 and P2000; the polystyrene-poly(ethylene-butylene)-polystyrene triblock copolymer comprising 60 weight polystyrene available from Kuraray as SEPTON™ S8104; the polystyrene-poly(ethylene-ethylene/propylene)-polystyrene triblock copolymers available from Kuraray as SEPTON™ S4044, S4055, S4077, and S4099; and the polystyrene-poly(ethylene-propylene)-polystyrene triblock copolymer comprising 65 weight percent polystyrene available from Kuraray as SEPTON™ S2104.

In some embodiments, the impact modifier is a polystyrene-poly(ethylene-butylene)-polystyrene triblock copolymer having a polystyrene content of 25 to 35 weight percent and a weight average molecular weight of 200,000 to 400,000 atomic mass units.

When present, the impact modifier can be used in an amount of 1 to 10 weight percent, specifically 1 to 5 weight percent, based on the total weight of the composition.

The composition can, optionally, further comprise a hydrocarbon resin. Examples of hydrocarbon resins are aliphatic hydrocarbon resins, hydrogenated aliphatic hydrocarbon resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, terpene resins, hydrogenated terpene resins, terpene-phenol resins, rosins, and rosin esters, hydrogenated rosins and rosin esters, and mixtures thereof. As used herein, "hydrogenated", when referring to the hydrocarbon resin, includes fully, substantially, and partially hydrogenated resins. Suitable aromatic resins include aromatic modified aliphatic resins, aromatic modified cycloaliphatic resins, and hydrogenated aromatic hydrocarbon resins having an aromatic content of 1 to 30 weight percent. Any of the above resins can be grafted with an unsaturated ester or anhydride using methods known in the art. Such grafting can provide enhanced properties to the resin. In some embodiments, the hydrocarbon resin is a hydrogenated aromatic hydrocarbon resin.

Suitable hydrocarbon resins are commercially available and include, for example, EMPR™ 100, 101, 102, 103, 104, 105, 106, 107, 108, 109, 110, 116, 117, and 118 resins, and OPPERA™ resins, available from ExxonMobil Chemical Company; ARKON™ P140, P125, P115, M115, and M135, and SUPER ESTER™ rosin esters available from Arakawa Chemical Company of Japan; SYLVARES™ polyterpene resins, styrenated terpene resins and terpene phenolic resins available from Arizona Chemical Company; SYLVATAC™ and SYLVALITE™ rosin esters available from Arizona Chemical Company; NORSOLENE™ aliphatic aromatic resins available from Cray Valley; DERTOPHENE™ terpene phenolic resins and DERCOLYTE™ polyterpene resins available from DRT Chemical Company; EASTOTAC™ resins, PICCOTAC™ resins, REGALITE™ and REGALREZ™ hydrogenated cycloaliphatic/aromatic resins, and PICCOLYTE™ and PERMALYN™ polyterpene resins, rosins, and rosin esters available from Eastman Chemical Company; WINGTACK™ resins available from Goodyear Chemical Company; coumarone/indene resins available from Neville Chemical Company; QUINTONE™ acid modified C5 resins, C5/C9 resins, and acid-modified C5/C9 resins available from Nippon Zeon; and CLEARON™ hydrogenated terpene resins available from Yasuhara. In some embodiments, the hydrocarbon resin is a hydrogenated terpene resin. In some embodiments, the hydrocarbon resin is a saturated polyalicyclic hydrocarbon resin.

The hydrocarbon resin can have a softening point of at least 120° C. measured according to ASTM E28. Specifically, the softening point can be 120 to 180° C., specifically 130 to 170° C., more specifically 140 to 160° C. In some embodiments, the hydrocarbon resin comprises a hydrogenated alicyclic hydrocarbon resin, a hydrogenated terpene resin, or a combination thereof. In some embodiments, the hydrocarbon resin comprises a hydrogenated alicyclic hydrocarbon resin having a softening point of 120 to 135° C. An example of such a resin is ARKON™ P125 having a softening point of about 125° C., available from Arakawa Chemical Company, In some embodiments, the hydrocarbon resin comprises a hydrogenated alicyclic hydrocarbon resin having a softening point of 135 to 145° C. An example of such a resin is ARKON™ P140 having a softening point of about 140° C., available from Arakawa Chemical Company, In some embodiments, the hydrocarbon resin comprises a hydrogenated terpene resin having a softening point of 145 to 160° C. An example of such a resin is CLEARON™ P150 available from Yasuhara.

When present, the hydrocarbon resin can be used in an amount of 1 to 8 weight percent, specifically 2 to 6 weight percent, based on the total weight of the composition.

The composition can, optionally, further comprise a trihydrocarbyl phosphite. Trihydrocarbyl phosphites have the general structure $P(OR^{30})_3$, wherein each occurrence of $R^{30}$ is independently $C_1$-$C_{18}$ hydrocarbyl. In some embodiments, each $R^{30}$ is independently $C_6$-$C_{18}$ alkyl. In other embodiments, at least one $R^{30}$ is $C_6$-$C_{18}$ aryl. In some embodiments, each occurrence of $R^{19}$ is independently an unsubstituted or substituted $C_6$-$C_{18}$ aryl. Suitable trihydrocarbyl phosphites include, for example, trioctyl phosphite, tridecyl phosphite, tridodecyl phosphite, phenyl didecyl phosphite, decyl diphenyl phosphite, triphenyl phosphite, tritolyl phosphites, tris(2,4-di-tert-butylphenyl)phosphite, bis(2,4-di-tert-butylphenyl) pentaerythritol diphosphite, and the like, and combinations thereof. Suitable trihydrocarbyl phosphites further include spiro diphosphites such as, for example, 3,9-bis[2,4-bis(1,1-dimethylethyl)phenoxy]-2,4,8,10-tetraoxa-3,9-diphosphaspiro[5.5]undecane (CAS Reg. No. 26741-53-7; commercially available from Ciba under the trade name IRGAFOS™ 126). In some embodiments, the aryl phosphite comprises tris(2,4-di-tert-butylphenyl)phosphite (CAS Reg. No. 31570-04-4). In some embodiments, the aryl phosphite comprises bis(2,4-di-tert-butylphenyl)pentaerythritol diphosphite (CAS Reg. No. 26741-53-7).

When present, the trihydrocarbyl phosphite can be used in an amount of 0.05 to 1 weight percent, specifically 0.1 to 0.5 weight percent, based on the total weight of the composition.

The composition can, optionally, further comprise linear low density polyethylene (LLDPE). Linear low density polyethylene is a copolymer of ethylene and a longer chain olefin such as 1-butene, 1-hexene, or 1-octene. In some embodiments, the linear low density polyethylene is a copolymer of ethylene and 1-butene. Linear low density polyethylene typically has a density of about 0.92 grams/centimeter$^3$. When present, the linear low density polyethylene can be used in an amount of 0.5 to 5 weight percent, specifically 0.5 to 3 weight percent, based on the total weight of the composition.

The composition can, optionally, further comprise one or more additives known in the thermoplastics art. For example, the composition can, optionally, further comprise an additive chosen from stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and the like, and combinations thereof. When present, such additives are typically used in a total amount of less than or equal to 5 weight percent, specifically less than or equal to 4 weight percent, more specifically less than or equal to 3 weight percent, based on the total weight of the composition.

The composition can, optionally, exclude polymers other than those required. For example, the composition can comprise less than or equal to 1 weight percent of each of polyamides and polyesters. In some embodiments, the composition comprises less than or equal to 4 weight percent, specifically less than or equal to 3 weight percent, more specifically less than or equal to 2 weight percent, of polyolefins. In some embodiments, the composition comprises less than or equal to 1 weight percent of polyolefins other than linear low density polyethylene. In other embodiments, the composition comprises less than or equal to 1 weight percent of any polyolefins.

One advantage of the composition is that it can achieve a UL 94 V-0 rating without using the halogenated flame retardants that are typically employed in glass-filled polyester compositions utilized for similar product applications. Thus, the composition can comprise less than or equal to 0.1 weight percent halogens, specifically less than or equal to 0.01 weight percent halogens, based on the total weight of the composition. In some embodiments, composition is halogen-free.

In some embodiments, the article is a fuser holder, and the composition comprises 2 to 10 weight percent of a poly (phenylene ether)-polysiloxane block copolymer reaction product, and further comprises 55 to 75 weight percent of a second poly(phenylene ether). In these embodiments, the reinforcing filler amount is, optionally, 10 to 20 weight percent, and the reinforcing filler optionally comprises glass fibers. Also in these embodiments, the composition optionally further comprises 1 to 5 weight percent of a hydrogenated block copolymer of an alkenyl aromatic compound and a conjugated diene.

In a very specific embodiment, the article is a fuser holder, the poly(phenylene ether)-polysiloxane copolymer comprises a poly(phenylene ether)-polysiloxane block copolymer provided in the form of a poly(phenylene ether)-polysiloxane block copolymer reaction product, the poly (phenylene ether)-polysiloxane block copolymer comprises a poly(phenylene ether) block comprising phenylene ether repeat units having the structure

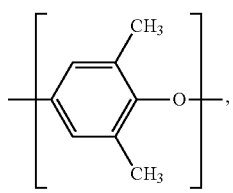

and
a polysiloxane block having the structure

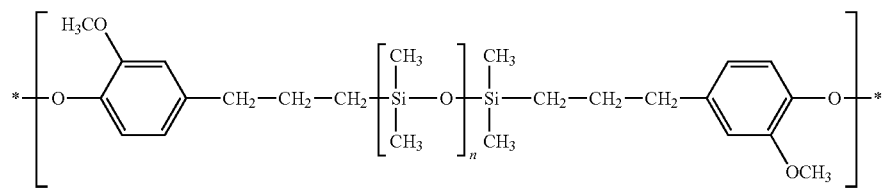

wherein n is 30 to 60; the reinforcing filler comprises glass fibers; the flame retardant comprises bisphenol A bis(diphenyl phosphate); the composition comprises 2 to 10 weight percent of the poly(phenylene ether)-polysiloxane block copolymer reaction product, 5 to 15 weight percent of the flame retardant, and 10 to 20 weight percent of the reinforcing filler; and the composition further comprises 55 to 75 weight percent of a second poly(phenylene ether) comprising poly(2,6-dimethyl-1,4-phenylene ether), and 1 to 5 weight percent of a polystyrene-poly(ethylene-butylene)-polystyrene block copolymer.

In some embodiments, the article is selected from the group consisting of fan blades, battery parts for hybrid and electric vehicles, parts for automotive kinetic energy recovery systems, and electric vehicle junction boxes, and the composition comprises 53 to 63 weight percent of a poly(phenylene ether)-polysiloxane block copolymer reaction product. In these embodiments, the reinforcing filler amount is, optionally, 15 to 25 weight percent, and the reinforcing filler optionally comprises glass fibers. Also in these embodiments, the composition optionally comprises 0 to 4 weight percent of a hydrogenated block copolymer of an alkenyl aromatic compound and a conjugated diene. Also in these embodiments, the composition optionally comprises 0.5 to 3 weight percent of a linear low density polyethylene.

In a very specific embodiment, the article is selected from the group consisting of fan blades, battery parts for hybrid and electric vehicles, parts for automotive kinetic energy recovery systems, and electric vehicle junction boxes; the poly(phenylene ether)-polysiloxane copolymer comprises a poly(phenylene ether)-polysiloxane block copolymer provided in the form of a poly(phenylene ether)-polysiloxane block copolymer reaction product; the poly(phenylene ether)-polysiloxane block copolymer comprises a poly(phenylene ether) block comprising phenylene ether repeat units having the structure

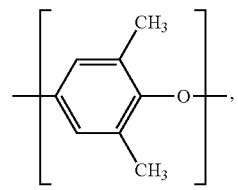

and
a polysiloxane block having the structure

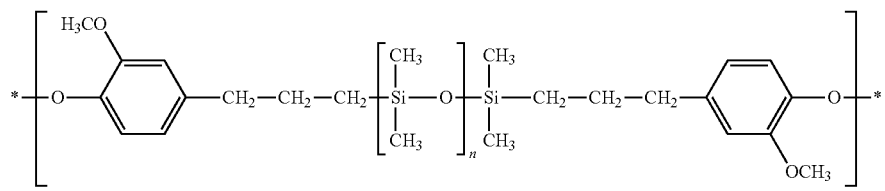

wherein n is 30 to 60; the reinforcing filler comprises glass fibers; the flame retardant comprises bisphenol A bis(diphenyl phosphate); the composition comprises 53 to 63 weight percent of the poly(phenylene ether)-polysiloxane block copolymer reaction product, 15 to 25 weight percent of the flame retardant, and 15 to 25 weight percent of the reinforcing filler; and the composition further comprises 0.5 to 3 weight percent of a linear low density polyethylene.

As described above, the article can be a fuser holder for an electrophotographic copier, a fan blade, a battery part for hybrid and electric vehicles, a part for an automotive kinetic energy recovery system, or an electric vehicle junction box. Other than their being fabricated with the composition described herein, such articles are known, as are methods for their fabrication. For example, U.S. Pat. No. 5,499,087 of Hiraoka et al. describes a fuser holder for an electrophotographic copier. Suitable methods of forming such articles include single layer and multilayer sheet extrusion, injection molding, blow molding, film extrusion, profile extrusion, pultrusion, compression molding, thermoforming, pressure forming, hydroforming, vacuum forming, and the like. Combinations of the foregoing article fabrication methods can be used. In some embodiments, the article is formed by injection molding. In some of these embodiments, the injection molding uses a barrel temperature of 285 to 330° C., specifically 295 to 325° C., and a mold temperature of 60 to 120° C., specifically 80 to 110° C.

All ranges disclosed herein are inclusive of the endpoints, and the endpoints are independently combinable with each other. Each range disclosed herein constitutes a disclosure of any point or sub-range lying within the disclosed range.

The invention includes at least the following embodiments.

Embodiment 1

An article comprising a composition, wherein the article is selected from the group consisting of fuser holders for electrophotographic copiers, fan blades, battery parts for hybrid and electric vehicles, parts for automotive kinetic energy recovery systems, and electric vehicle junction boxes; wherein the composition comprises 0.5 to 85 weight percent of a poly(phenylene ether)-polysiloxane copolymer comprising a poly(phenylene ether)-polysiloxane block copolymer, a poly(phenylene ether)-polysiloxane graft copolymer, or a combination thereof; 5 to 25 weight percent of a flame retardant comprising an organophosphate ester, a phosphazene, or a combination thereof; and 10 to 35 weight percent of a reinforcing filler; wherein all weight percent values are based on the total weight of the composition; provided that when the article is a fuser holder, the composition comprises 2 to 10 weight percent of a poly(phenylene ether)-polysiloxane block copolymer reaction product comprising the a poly(phenylene ether)-polysiloxane block copolymer and a first a poly (phenylene ether), and further comprises 55 to 75 weight percent of a second poly(phenylene ether).

Embodiment 2

The article of embodiment 1, wherein the poly(phenylene ether)-polysiloxane copolymer comprises the poly(phenylene ether)-polysiloxane block copolymer.

Embodiment 3

The article of embodiment 2, wherein composition comprises a poly(phenylene ether)-polysiloxane block copolymer reaction product comprising the poly(phenylene ether)-polysiloxane block copolymer and a first poly(phenylene ether), and wherein the poly(phenylene ether)-polysiloxane block copolymer comprises a poly(phenylene ether) block comprising phenylene ether repeat units having the structure

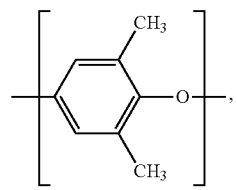

and
a polysiloxane block having the structure

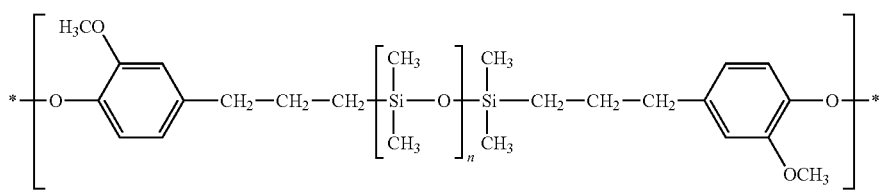

wherein n is 30 to 60.

Embodiment 4

The article of embodiment 2, wherein the poly(phenylene ether)-polysiloxane block copolymer comprises a poly(phenylene ether)-polysiloxane multiblock copolymer.

Embodiment 5

The article of embodiment 1, wherein the poly(phenylene ether)-polysiloxane copolymer comprises the poly(phenylene ether)-polysiloxane graft copolymer.

Embodiment 6

The article of any of embodiments 1-5, wherein the reinforcing filler is selected from the group consisting of glass fibers, carbon fibers, wollastonite, halloysite, clays, talcs, micas, glass flakes, solid glass beads, hollow glass beads, solid ceramic beads, hollow ceramic beads, and combinations thereof.

Embodiment 7

The article of any of embodiments 1-5, wherein the reinforcing filler comprises glass fibers.

Embodiment 8

The article of any of embodiments 1-7, wherein the flame retardant comprises the organophosphate ester.

Embodiment 9

The article of embodiment 8, wherein the organophosphate ester comprises bisphenol A bis(diphenyl phosphate).

Embodiment 10

The article of any of embodiments 1-9, wherein the flame retardant comprises the phosphazene.

Embodiment 11

The article of embodiment 10, wherein the flame retardant comprises a cyclic oligo(bis(phenoxy)phosphazene), a linear oligo(bis(phenoxy)phosphazene), a linear poly(bis(phenoxy) phosphazene), a crosslinked poly(bis(phenoxy)phosphazene), or a combination thereof.

Embodiment 12

The article of any of embodiments 1-11, wherein the composition further comprises 1 to 10 weight percent of an impact modifier selected from the group consisting of rubber-modified polystyrenes, unhydrogenated block copolymers of an alkenyl aromatic monomer and a conjugated diene, hydrogenated block copolymers of an alkenyl aromatic monomer and a conjugated diene, acrylate core-shell impact modifiers, and combinations thereof.

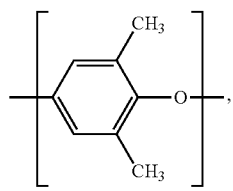

and
a polysiloxane block having the structure

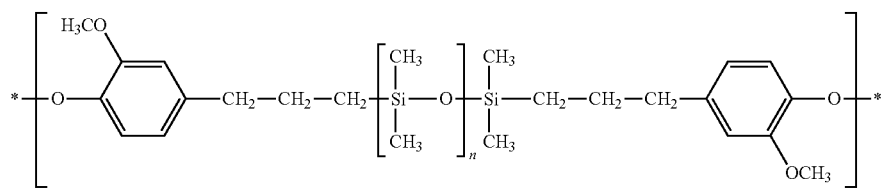

wherein n is 30 to 60; wherein the first poly(phenylene ether) comprises poly(2,6-dimethyl-1,4-phenylene ether); wherein the reinforcing filler comprises glass fibers; wherein the flame retardant comprises bisphenol A bis(diphenyl phosphate); wherein the composition comprises 2 to 10 weight percent of the poly(phenylene ether)-polysiloxane block copolymer reaction product, 5 to 15 weight percent of the flame retardant, and 10 to 20 weight percent of the reinforcing filler; and wherein the composition further comprises 55 to 75 weight percent of a second poly(phenylene ether) comprising poly (2,6-dimethyl-1,4-phenylene ether), and 1 to 5 weight percent of a polystyrene-poly(ethylene-butylene)-polystyrene block copolymer.

Embodiment 13

The article of embodiment 1, wherein the article is a fuser holder; and wherein the composition comprises 2 to 10 weight percent of a poly(phenylene ether)-polysiloxane block copolymer reaction product comprising the poly(phenylene ether)-polysiloxane block copolymer and a first poly (phenylene ether); and wherein the composition further comprises 55 to 75 weight percent of a second poly(phenylene ether).

Embodiment 14

The article of embodiment 13, wherein the composition comprises 10 to 20 weight percent of the reinforcing filler, and the reinforcing filler comprises glass fibers.

Embodiment 15

The article of embodiment 13 or 14, wherein the composition further comprises 1 to 5 weight percent of a hydrogenated block copolymer of an alkenyl aromatic compound and a conjugated diene.

Embodiment 16

The article of embodiment 1, wherein the article is a fuser holder; wherein the composition comprises a poly(phenylene ether)-polysiloxane block copolymer reaction product comprising the poly(phenylene ether)-polysiloxane block copolymer and a first poly(phenylene ether); wherein the poly(phenylene ether)-polysiloxane block copolymer comprises a poly(phenylene ether) block comprising phenylene ether repeat units having the structure Embodiment 17

The article of embodiment 1, wherein the article is selected from the group consisting of fan blades, battery parts for hybrid and electric vehicles, parts for automotive kinetic energy recovery systems, and electric vehicle junction boxes; and wherein the composition comprises 53 to 63 weight percent of a poly(phenylene ether)-polysiloxane block copolymer reaction product comprising the poly(phenylene ether)-polysiloxane block copolymer and a first poly(phenylene ether).

Embodiment 18

The article of embodiment 17, wherein the composition comprises 15 to 25 weight percent of the reinforcing filler, and the reinforcing filler comprises glass fibers.

Embodiment 19

The article of embodiment 17 or 18, wherein the composition comprises 0 to 4 weight percent of a hydrogenated block copolymer of an alkenyl aromatic compound and a conjugated diene.

Embodiment 20

The article of any of embodiments 17-19, wherein the composition further comprises 0.5 to 3 weight percent of a linear low density polyethylene.

Embodiment 21

The article of embodiment 1, wherein the article is selected from the group consisting of fan blades, battery parts for hybrid and electric vehicles, parts for automotive kinetic energy recovery systems, and electric vehicle junction boxes; wherein the composition comprises a poly(phenylene ether)-polysiloxane block copolymer reaction product comprising the poly(phenylene ether)-polysiloxane block copolymer and a first poly(phenylene ether);wherein the poly(phenylene ether)-polysiloxane block copolymer comprises a poly(phenylene ether) block comprising phenylene ether repeat units having the structure

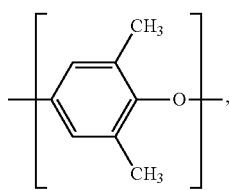

and
a polysiloxane block having the structure

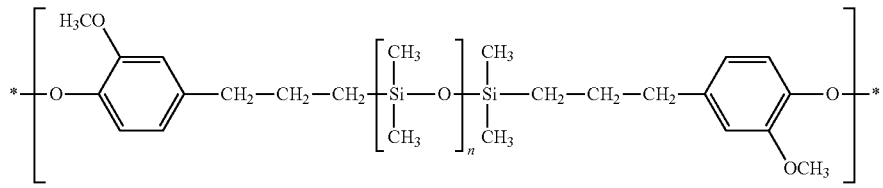

wherein n is 30 to 60; wherein the reinforcing filler comprises glass fibers; wherein the flame retardant comprises bisphenol A bis(diphenyl phosphate); wherein the composition comprises 53 to 63 weight percent of the poly(phenylene ether)-polysiloxane block copolymer reaction product, 15 to 25 weight percent of the flame retardant, and 15 to 25 weight percent of the reinforcing filler; and wherein the composition further comprises 0.5 to 3 weight percent of a linear low density polyethylene.

The invention is further illustrated by the following non-limiting examples.

Comparative Examples 1-15

These comparative examples utilize poly(phenylene ether) homopolymer, rather than poly(phenylene ether)-polysiloxane block copolymer reaction product. Components used to prepare the compositions are summarized in Table 1.

TABLE 1

| Component | Description |
|---|---|
| PPE 0.46 | Poly(2,6-dimethyl-1,4-phenylene ether), CAS Reg. No. 25134-01-4, having an intrinsic viscosity of about 0.46 deciliter per gram measured in chloroform at 25° C.; available as PPO ™ 646 from SABIC Innovative Plastics. |
| PPE 0.40 | Poly(2,6-dimethyl-1,4-phenylene ether), CAS Reg. No. 25134-01-4, having an intrinsic viscosity of about 0.40 deciliter per gram measured in chloroform at 25° C.; available as PPO ™ 640 from SABIC Innovative Plastics. |
| PPE 0.33 | Poly(2,6-dimethyl-1,4-phenylene ether), CAS Reg. No. 25134-01-4, having an intrinsic viscosity of about 0.33 deciliter per gram measured in chloroform at 25° C.; available as PPO ™ 630 from SABIC Innovative Plastics. |
| PPE 0.30 | Poly(2,6-dimethyl-1,4-phenylene ether), CAS Reg. No. 25134-01-4, having an intrinsic viscosity of about 0.30 deciliter per gram measured in chloroform at 25° C.; available as PPO ™ 808 from SABIC Innovative Plastics. |
| PPE-Si | A mixture of poly(2,6-dimethyl-1,4-phenylene ether) (CAS Reg. No. 24938-67-8) and poly(2,6-dimethyl-1,4-phenylene ether)-polydimethylsiloxane block copolymer (CAS Reg. No. 1202019-56-4), the mixture having a polysiloxane content of about 5 weight percent and an intrinsic viscosity of about 0.4 deciliter per gram as measured in chloroform at 25° C.; prepared according to the procedure of U.S. Pat. No. 8,017,697 to Carrillo et al., Example 16. |
| SEBS | Polystyrene-poly(ethylene/butylene)-polystyrene triblock copolymer, CAS Reg. No. 66070-58-4, having a polystyrene content of 30-33 weight percent and a weight average molecular weight of 240,000-301,000 atomic mass units; obtained as KRATON ™ G1651 from Kraton Performance Polymers Inc. |
| AO 168 | Tris(2,4-di-tert-butylphenyl) phosphite, CAS Reg. No. 31570-04-4, available from BASF Corp. as IRGAFOS ™ 168, or from Chemtura as ALKANOX ™ 240. |
| AO 626 | Bis(2,4-di-tert-butylphenyl)pentaerythritol diphosphite, CAS Reg. No. 26741-53-7, available from Chemtura as ULTRANOX ™ 626 |
| HCR | Saturated polyalicyclic hydrocarbon resin, CAS Reg. No. 64742-16-1, available from Arakawa Chemical as ARKON ™ P-125. |
| HIPS | Rubber-modified polystyrene, CAS Reg. No. 9003-55-8, available from SABIC Innovative Plastics as HIPS3190. |
| Clay | Water-washed kaolin clay, CAS Reg. No. 1332-58-7, available as KaMin POLYFIL ™ HG90 from KaMin Performance Minerals. |
| Mica | Phlogopite mica, CAS Reg. No. 12001-26-2, available from Imerys Performance Minerals as SUZORITE ™ HK-200. |
| Glass Fiber | Chopped glass fiber having a diameter of about 14 micrometers and a pre-compounded length of about 4 millimeters; available from Owens Corning as 122Y-14C. |
| Carbon Black | Carbon black pigment, CAS Reg. No. 1333-86-4, available from Cabot as BLACK PEARLS ™ 800 or MONARCH ™ 800. |
| LLDPE | Linear low density polyethylene (copolymer of ethylene and 1-butene), CAS Reg. No. 25087-34-7, having a density of 0.925 grams per cubic centimeter and a melt volume flow rate of 20 cubic centimeters per 10 minutes at 190° C. |

TABLE 1-continued

| Component | Description |
|---|---|
| | and 2.16 kilogram load, available from ExxonMobil as ESCORENE ™ LL5100.09. |
| MgO | Magnesium oxide, CAS Reg. No. 1309-48-4, available from Kyowa Chemical Co. Ltd. as KYOWAMAG ™ 150. |
| ZnS | Zinc sulfide, CAS Reg. No. 1314-98-3, available from Sachtleben Chemie GmbH as SACHTOLITH ™ HD-S. |
| But-TPP | t-Butylated triphenyl phosphate, CAS Reg. No. 220352-35-2, available as PHOSFLEX ™ 71B from Supresta LLC. |
| BPADP | Bisphenol A bis(diphenyl phosphate), CAS Reg. No. 181028-79-5; obtained as FYROFLEX ™ BDP from Supresta LLC, or REOFOS ™ BAPP from Great Lakes Chemical Co. Ltd. |

Resin compositions were compounded on a 30 millimeter Werner & Pfleiderer ZSK twin-screw extruder operating at 350 rotations per minute and a throughput of 18 kilograms per hour (40 pounds per hour) and using barrel set temperatures of 240° C./260° C. /290° C./290° C./290° C. from the feed port to die. Glass fibers were added downstream to the extruder, while all other solid components were added at the feed throat and the liquid flame retardant (But-TPP or BPADP) was injected at a port between the feed throat and the glass fiber feed location. The compounded resins were pelletized by strand-cutting.

Test articles for ASTM determinations of heat deflection temperature and flexural properties were injection molded on a 120 Ton VanDorn injection molding machine using a barrel temperature of 288-310° C. (550-590° F.) and a mold temperature of about 88° C. (about 190° F.). Flame bars with 1.0 or 1.5 millimeter thickness were injection molded on an 80 Ton VanDorn injection molding machine using a barrel temperature of 299-321° C. (570-610° F.) and a mold temperature of 88-99° C. (190-210° F.).

Flame retardancy of injection molded flame bars was determined according to Underwriter's Laboratory Bulletin 94 "Tests for Flammability of Plastic Materials, UL 94", 20 mm Vertical Burning Flame Test. Before testing, flame bars with a thickness of 1.0 or 1.5 millimeters were conditioned at 23° C. and 50% relative humidity for at least 24 hours. In the UL 94 20 mm Vertical Burning Flame Test, a set of ten flame bars was tested. For each bar, a flame was applied to the bar then removed, and the time required for the bar to self-extinguish (first afterflame time, t1) was noted. The flame was then reapplied and removed, and the time required for the bar to self-extinguish (second afterflame time, t2) and the post-flame glowing time (afterglow time, t3) were noted. To achieve a rating of V-0, the afterflame times t1 and t2 for each individual specimen must have been less than or equal to 10 seconds; and the total afterflame time for all ten specimens (t1 plus t2 for all ten specimens) must have been less than or equal to 100 seconds; and the second afterflame time plus the afterglow time for each individual specimen (t2+t3) must have been less than or equal to 30 seconds; and no specimen can have flamed or glowed up to the holding clamp; and the cotton indicator cannot have been ignited by flaming particles or drops. To achieve a rating of V-1, the afterflame times t1 and t2 for each individual specimen must have been less than or equal to 30 seconds; and the total afterflame time for all ten specimens (t1 plus t2 for all ten specimens) must have been less than or equal to 500 seconds; and the second afterflame time plus the afterglow time for each individual specimen (t2+t3) must have been less than or equal to 60 seconds; and no specimen can have flamed or glowed up to the holding clamp; and the cotton indicator cannot have been ignited by flaming particles or drops. To achieve a rating of V-2, the afterflame times t1 and t2 for each individual specimen must have been less than or equal to 30 seconds; and the total afterflame time for all ten specimens (t1 plus t2 for all ten specimens) must have been less than or equal to 250 seconds; and the second afterflame time plus the afterglow time for each individual specimen (t2+t3) must have been less than or equal to 60 seconds; and no specimen can have flamed or glowed up to the holding clamp; but the cotton indicator can have been ignited by flaming particles or drops. Compositions not achieving a rating of V-2 were considered to have failed.

Heat deflection temperature (HDT) values, expressed in units of degrees centigrade, were determined according to ASTM D 648-07 using 6 4 millimeter thick bars (except where specified as 3 2 millimeter thickness), an edgewise test direction, a support span of 100 millimeters (Method B), a stress of 1.82 megapascals, a deflection of 0.25 millimeters at reading, a heating rate of 2° C./minute, and three specimens per composition.

Flexural modulus and flexural strength values, each in units of megapascals, were determined at 23° C. according to ASTM D 790-07e1 using 6 4 millimeter thick bars, a support span of 101.6 millimeters, a test speed of 2.54 millimeters/minute (0.1 inch/minute; Procedure A), and three specimens per composition.

Compositions and results are summarized in Table 2, where component amounts are expressed in weight percent based on the total weight of the composition.

The Table 2 results show that the achievement of a flame retardancy rating of V-0 at a bar thickness of 1 5 millimeters is limited to Comparative Examples 1-3 with very high flame retardant concentrations (>21.00 weight percent) and correspondingly low heat deflection temperatures (112° C.). A flame retardancy rating of V-0 at 10 millimeter thickness was only observed for Comparative Example 1 with a low heat deflection temperature of 106° C.

TABLE 2

| | C. Ex. 1 | C. Ex. 2 | C. Ex. 3 | C. Ex. 4 | C. Ex. 5 |
|---|---|---|---|---|---|
| COMPOSITIONS | | | | | |
| PPE 0.40 | 63 | 56 | 49 | 67.5 | 60 |
| BPADP | 27 | 24 | 21 | 22.5 | 20 |
| Glass fiber | 10 | 20 | 30 | 10 | 20 |
| PROPERTIES | | | | | |
| UL 94 rating at 1.5 mm | V-0 | V-0 | V-0 | Fail | Fail |
| UL 94 rating at 1.0 mm | V-0 | V-1 | V-1 | V-1 | V-1 |
| HDT (° C.) | 106 | 111 | 112 | 120 | 124 |
| Flex. modulus (MPa) | 4670 | 7120 | 9610 | 4670 | 6850 |
| Flex. strength (MPa) | 144 | 153 | 159 | 145 | 149 |

| | C. Ex. 6 | C. Ex. 7 | C. Ex. 8 | C. Ex. 9 | C. Ex. 10 |
|---|---|---|---|---|---|
| COMPOSITIONS | | | | | |
| PPE 0.40 | 52.5 | 72 | 64 | 56 | 76.5 |
| BPADP | 17.5 | 18 | 16 | 14 | 13.5 |
| Glass fiber | 30 | 10 | 20 | 30 | 10 |

TABLE 2-continued

| PROPERTIES | | | | | |
|---|---|---|---|---|---|
| UL 94 rating at 1.5 mm | V-1 | V-1 | V-1 | V-1 | V-1 |
| UL 94 rating at 1.0 mm | V-1 | V-1 | V-1 | V-1 | V-1 |
| HDT (° C.) | 124 | 133 | 137 | 138 | 149 |
| Flex. modulus (MPa) | 9090 | 4370 | 6490 | 8380 | 4250 |
| Flex. strength (MPa) | 158 | 147 | 149 | 151 | 145 |

| | C. Ex. 11 | C. Ex. 12 | C. Ex. 13 | C. Ex. 14 | C. Ex. 15 |
|---|---|---|---|---|---|
| COMPOSITIONS | | | | | |
| PPE 0.40 | 68 | 59.5 | 81 | 72 | 63 |
| BPADP | 12 | 10.5 | 9 | 8 | 7 |
| Glass fiber | 20 | 30 | 10 | 20 | 30 |
| PROPERTIES | | | | | |
| UL 94 rating at 1.5 mm | Fail | V-1 | V-1 | V-1 | V-1 |
| UL 94 rating at 1.0 mm | V-1 | Fail | V-1 | V-1 | V-1 |
| HDT (° C.) | 152 | 154 | 164 | 168 | 170 |
| Flex. modulus (MPa) | 6000 | 8050 | 4100 | 5830 | 7890 |
| Flex. strength (MPa) | 142 | 152 | 142 | 145 | 155 |

Comparative Examples 16-23

Eight comparative examples were prepared using poly (phenylene ether) homopolymer and the hydrogenated block copolymer SEBS. These examples illustrate that it is not feasible to achieve a V-0 rating at 1 5 millimeter thickness in a composition with a heat deflection temperature of at least 150° C. and at least 10% glass fiber reinforcement, even though the corresponding unfilled compositions (Comparative Examples 16 and 20) have a V-0 flame retardancy. Relative to the property balance exhibited by the inventive composition, unfilled Comparative Examples 16 and 20 are deficient, at least, in flexural modulus, and filled Comparative Examples 17-19 and 21-23 are deficient, at least, in UL 94 rating.

TABLE 3

| | C. Ex. 16 | C. Ex. 17 | C. Ex. 18 | C. Ex. 19 |
|---|---|---|---|---|
| COMPOSITIONS | | | | |
| PPE 0.46 | 84.70 | 76.23 | 67.76 | 72.00 |
| BPADP | 10.00 | 9.00 | 8.00 | 8.50 |
| SEBS | 5.00 | 4.5 | 4.00 | 4.25 |
| AO 168 | 0.30 | 0.27 | 0.24 | 0.25 |
| Glass fiber | 0.00 | 10 | 20 | 10.00 |
| Clay | 0.00 | 0.00 | 0.00 | 5.00 |
| PROPERTIES | | | | |
| UL 94 rating at 1.5 mm | V-0 | V-1 | V-1 | V-1 |
| HDT (° C.) | 146 | 159 | 163 | 159 |
| Flex. modulus (MPa) | 2520 | 3721 | 5234 | 4235 |
| Flex. strength (MPa) | 106 | 122 | 132 | 136 |

| | C. Ex. 20 | C. Ex. 21 | C. Ex. 22 | C. Ex. 23 |
|---|---|---|---|---|
| COMPOSITIONS | | | | |
| PPE 0.46 | 82.70 | 74.43 | 66.16 | 70.30 |
| BPADP | 12.00 | 10.80 | 9.60 | 10.20 |
| SEBS | 5.00 | 4.50 | 4.00 | 4.25 |
| AO 168 | 0.30 | 0.27 | 0.24 | 0.25 |
| Glass fiber | 0.00 | 10.00 | 20.00 | 10.00 |
| Clay | 0.00 | 0.00 | 0.00 | 5.00 |
| PROPERTIES | | | | |
| UL 94 rating at 1.5 mm | V-0 | V-1 | V-1 | V-1 |
| HDT (° C.) | 139 | 152 | 156 | 153 |
| Flex. modulus (MPa) | 2570 | 3937 | 5363 | 4297 |
| Flex. strength (MPa) | 108 | 128 | 131 | 135 |

Examples 1-6, Comparative Examples 24 and 25

These inventive and comparative examples illustrate the use of a poly(phenylene ether)-polysiloxane block copolymer in combination with the hydrogenated block copolymer SEBS. Inventive Examples 1-6 all have heat deflection temperature values of at least 155° C., as well as UL 94 ratings of V-0 at 1 5 millimeter thickness, and flexural modulus values greater than 3,500 megapascals. Comparative Examples 24 and 25 are unfilled and exhibit substantially lower heat deflection temperature values, flexural modulus values, and flexural strength values.

TABLE 4

| | C. Ex. 24 | Ex. 1 | Ex. 2 | Ex. 3 |
|---|---|---|---|---|
| COMPOSITIONS | | | | |
| PPE-Si | 87.70 | 78.93 | 70.16 | 74.55 |
| BPADP | 7.00 | 6.30 | 5.60 | 5.95 |
| SEBS | 5.00 | 4.50 | 4.00 | 4.25 |
| AO 168 | 0.30 | 0.27 | 0.24 | 0.25 |
| Glass fiber | 0.00 | 10.00 | 20.00 | 10.00 |
| Clay | 0.00 | 0.00 | 0.00 | 5.00 |
| PROPERTIES | | | | |
| UL 94 rating at 1.5 mm | V-0 | V-0 | V-0 | V-0 |
| HDT (° C.) | 149 | 163 | 168 | 163 |
| Flex. modulus (MPa) | 2310 | 3506 | 4942 | 3891 |
| Flex. strength (MPa) | 94 | 119 | 133 | 125 |

| | C. Ex. 25 | Ex. 4 | Ex. 5 | Ex. 6 |
|---|---|---|---|---|
| COMPOSITIONS | | | | |
| PPE-Si | 85.70 | 77.13 | 68.56 | 72.85 |
| BPADP | 9.00 | 8.10 | 7.20 | 7.65 |
| SEBS | 5.00 | 4.50 | 4.00 | 4.25 |
| AO 168 | 0.30 | 0.27 | 0.24 | 0.25 |
| Glass fiber | 0.00 | 10.00 | 20.00 | 10.00 |
| Clay | 0.00 | 0.00 | 0.00 | 5.00 |
| PROPERTIES | | | | |
| UL 94 rating at 1.5 mm | V-0 | V-0 | V-0 | V-0 |
| HDT (° C.) | 140 | 155 | 160 | 158 |
| Flex. modulus (MPa) | 2350 | 3739 | 5027 | 4039 |
| Flex. strength (MPa) | 96 | 123 | 130 | 129 |

Examples 7-15, Comparative Example 26

These inventive and comparative examples illustrate means of achieving improved melt flow.

Melt volume flow rate (MVR) values, expressed in units of cubic centimeters per 10 minutes, were determined according to ASTM D 1238-04 at 300° C. using a load of 5 kilograms, automatic timing (Procedure B), a capillary diameter of 2.0955 millimeters, a capillary length of 8.00 millimeters, a test specimen form of pellets, specimen conditioning for one hour at 70° C. prior to testing, and one sample with five readings per composition.

The results in Table 5 show that the inventive compositions can be modified to increase melt flow while still maintaining a high heat deflection temperature and a UL 94 rating of V-0 at 1.5 millimeters. Inventive Example 13 shows that a reduced concentration of poly(phenylene ether)-polysiloxane block copolymer also still results in V-0 at 1.5 mm. Inventive Example 15 illustrates the use of a mixed filler reinforcement. The examples also show that melt flow increases can be accomplished through use of a hydrocarbon resin flow promoter (Examples 10-15) and/or a phosphite antioxidant like AO 626. Inventive Example 7, without either hydrocarbon resin or phosphite antioxidant, exhibits relatively lower melt flow. Comparative Example 26 shows again that with poly(phenylene ether) homopolymer rather than poly(phenylene ether)-polysiloxane block copolymer reaction product, even a higher concentration of flame retardant does not result in V-0 flammability rating at 1.5 millimeters.

TABLE 5

|  | Ex. 7 | Ex. 8 | Ex. 9 | Ex. 10 | Ex. 11 |
|---|---|---|---|---|---|
| COMPOSITIONS | | | | | |
| PPE-Si | 68.66 | 68.26 | 67.86 | 68.26 | 68.26 |
| PPE 0.40 | 0.00 | 0.00 | 0.00 | 0.00 | 0.00 |
| BPADP | 6.97 | 6.97 | 6.97 | 6.97 | 6.97 |
| SEBS | 3.98 | 3.98 | 3.98 | 1.99 | 0.00 |
| HCR | 0.00 | 0.00 | 0.00 | 1.99 | 3.98 |
| AO 626 | 0.00 | 0.40 | 0.80 | 0.40 | 0.40 |
| Carbon black | 0.50 | 0.50 | 0.50 | 0.50 | 0.50 |
| Glass fiber | 19.90 | 19.90 | 19.90 | 19.90 | 19.90 |
| Mica | 0.00 | 0.00 | 0.00 | 0.00 | 0.00 |
| PROPERTIES | | | | | |
| UL 94 rating at 1.5 mm | V-0 | V-0 | V-0 | V-0 | V-0 |
| HDT (° C.) | 161 | 158 | 157 | 156 | 153 |
| MVR (cc/10 min) | 2.8 | 8.8 | 12.6 | 11.6 | 14.1 |
| Flex. modulus (MPa) | 5150 | 5180 | 5310 | 5320 | 5500 |
| Flex. strength (MPa) | 137 | 136 | 131 | 131 | 138 |

|  | Ex. 12 | Ex. 13 | Ex. 14 | Ex. 15 | C. Ex. 26 |
|---|---|---|---|---|---|
| COMPOSITIONS | | | | | |
| PPE-Si | 67.86 | 33.43 | 77.21 | 72.74 | 0.00 |
| PPE 0.40 | 0.00 | 33.43 | 0.00 | 0.00 | 65.27 |
| BPADP | 6.97 | 8.36 | 7.96 | 7.46 | 9.95 |
| SEBS | 0.00 | 1.99 | 1.99 | 1.99 | 3.98 |
| HCR | 3.98 | 1.99 | 1.99 | 1.99 | 0.00 |
| AO 626 | 0.80 | 0.40 | 0.40 | 0.40 | 0.40 |
| Carbon black | 0.50 | 0.50 | 0.50 | 0.50 | 0.50 |
| Glass fiber | 19.90 | 19.90 | 9.95 | 9.95 | 19.90 |
| Mica | 0.00 | 0.00 | 0.00 | 4.98 | 0.00 |
| PROPERTIES | | | | | |
| UL 94 rating at 1.5 mm | V-0 | V-0 | V-0 | V-0 | V-1 |
| HDT (° C.) | 151 | 153 | 152 | 153 | 155 |
| MVR (cc/10 min) | 21.8 | 13.1 | 16.3 | 13.4 | 8.28 |
| Flex. modulus (MPa) | 5660 | 5480 | 3910 | 4367 | 5640 |
| Flex. strength (MPa) | 134 | 133 | 122 | 124 | 136 |

Examples 16-19

These inventive examples illustrate that omission of hydrogenated block copolymer is associated with even higher heat deflection temperature values.

TABLE 6

|  | Ex. 16 | Ex. 17 | Ex. 18 | Ex. 19 |
|---|---|---|---|---|
| COMPOSITIONS | | | | |
| PPE-Si | 76.32 | 71.84 | 67.86 | 73.83 |
| BPADP | 7.46 | 6.97 | 6.97 | 4.98 |
| HCR | 0.00 | 0.00 | 3.98 | 0.00 |
| AO 626 | 0.80 | 0.80 | 0.80 | 0.80 |
| Carbon black | 0.50 | 0.50 | 0.50 | 0.50 |
| Glass fiber | 9.95 | 19.90 | 19.90 | 19.90 |
| Mica | 4.98 | 0.00 | 0.00 | 0.00 |
| PROPERTIES | | | | |
| UL 94 rating at 1.5 mm | V-0 | V-0 | V-0 | V-0 |
| HDT (° C.) | 157 | 159 | 153 | 168 |
| MVR (cc/10 min) | 18 | 14 | 23 | 9 |
| Flex. modulus (MPa) | 4700 | 5680 | 5650 | 5520 |
| Flex. strength (MPa) | 118 | 136 | 128 | 135 |

Examples 20 and 21, Comparative Examples 27 and 28

These inventive and comparative examples, all with 20% glass fiber reinforcement, illustrate that the improved flame retardancy associated with the use of poly(phenylene ether)-polysiloxane block copolymer reaction product rather than poly(phenylene ether) homopolymer can be obtained without sacrificing heat resistance. Comparative Example 28 also illustrates that a reduction of HIPS concentration and increases in flame retardant and poly(phenylene ether) homopolymer, all relative to Comparative Example 27, are not sufficient to result in V-0 flame performance at 1.5 millimeters.

TABLE 7

|  | C. Ex. 27 | Ex. 20 | C. Ex. 28 | Ex. 21 |
|---|---|---|---|---|
| COMPOSITIONS | | | | |
| PPE 0.46 | 48.00 | 0.00 | 55.00 | 0.00 |
| PPE-Si | 0.00 | 52.00 | 0.00 | 59.00 |
| HIPS | 24.50 | 20.50 | 16.50 | 12.50 |
| But-TPP | 6.00 | 6.00 | 7.00 | 7.00 |
| LLDPE | 1.00 | 1.00 | 1.00 | 1.00 |
| AO 626 | 0.30 | 0.30 | 0.30 | 0.30 |
| ZnS | 0.10 | 0.10 | 0.10 | 0.10 |
| MgO | 0.10 | 0.10 | 0.10 | 0.10 |
| Glass fiber | 20.00 | 20.00 | 20.00 | 20.00 |
| PROPERTIES | | | | |
| UL 94 rating at 1.5 mm | V-1 | V-0 | V-1 | V-0 |
| HDT at 3.2 mm (° C.) | 132 | 132 | 135 | 137 |

Examples 22 and 23, Comparative Examples 29 and 30

These inventive and comparative examples, all with 30% glass fiber reinforcement, further illustrate that the improved flame retardancy associated with the use of poly(phenylene ether)-polysiloxane block copolymer reaction product rather than poly(phenylene ether) homopolymer can be obtained without substantially sacrificing heat resistance. Comparative Example 30 also illustrates that a reduction of HIPS concentration and increases in flame retardant and poly(phenylene ether) homopolymer, all relative to Comparative Example 29, are not sufficient to result in V-0 flame performance at 1.5 millimeters.

TABLE 8

|  | C. Ex. 29 | Ex. 22 | C. Ex. 30 | Ex. 23 |
|---|---|---|---|---|
| COMPOSITIONS | | | | |
| PPE 0.46 | 49.00 | 0.00 | 51.50 | 0.00 |
| PPE-Si | 0.00 | 53.00 | 0.00 | 56.00 |
| HIPS | 12.00 | 8.00 | 8.50 | 4.00 |
| But-TPP | 7.50 | 7.50 | 8.50 | 8.50 |
| LLDPE | 1.00 | 1.00 | 1.00 | 1.00 |
| AO 168 | 0.30 | 0.30 | 0.30 | 0.30 |
| ZnS | 0.10 | 0.10 | 0.10 | 0.10 |
| MgO | 0.10 | 0.10 | 0.10 | 0.10 |
| Glass fiber | 30.00 | 30.00 | 30.00 | 30.00 |
| PROPERTIES | | | | |
| UL 94 rating at 1.5 mm | V-1 | V-0 | V-1 | V-0 |
| HDT at 3.2 mm (° C.) | 136 | 135 | 135 | 136 |

Examples 24-26, Comparative Examples 31-36

These inventive and comparative examples demonstrate that it is also possible to achieve a UL 94 rating of V-0 at a thickness of 0.75 millimeters in a 20% glass fiber reinforced composition containing poly(phenylene ether)-polysiloxane block copolymer, while maintaining a heat deflection temperature greater than 110° C. Comparative Example 36 achieved a V-0 rating but was deficient in heat deflection temperature.

TABLE 9

|  | Ex. 24 | Ex. 25 | Ex. 26 | C. Ex. 31 | C. Ex. 32 |
|---|---|---|---|---|---|
| COMPOSITIONS | | | | | |
| PPE-Si | 57.81 | 59.80 | 61.79 | 0.00 | 0.00 |
| PPE 0.40 | 0.00 | 0.00 | 0.00 | 57.81 | 54.83 |
| PPE 0.46 | 0.00 | 0.00 | 0.00 | 0.00 | 0.00 |
| BPADP | 19.90 | 17.91 | 15.92 | 19.90 | 22.89 |
| Glass fiber | 19.90 | 19.90 | 19.90 | 19.90 | 19.90 |
| LLDPE | 1.49 | 1.49 | 1.49 | 1.49 | 1.49 |
| AO 168 | 0.10 | 0.10 | 0.10 | 0.10 | 0.10 |
| ZnS | 0.15 | 0.15 | 0.15 | 0.15 | 0.15 |
| MgO | 0.15 | 0.15 | 0.15 | 0.15 | 0.15 |
| Carbon black | 0.50 | 0.50 | 0.50 | 0.50 | 0.50 |
| PROPERTIES | | | | | |
| UL 94 rating at 0.75 mm | V-0 | V-0 | V-0 | V-1 | V-1 |
| HDT (° C.) | 113 | 121 | 128 | 119 | 109 |
| Flex. modulus (MPa) | 6094 | 6178 | 6104 | 6530 | 6570 |
| Flex. strength (MPa) | 155 | 158 | 158 | 160 | 155 |

|  | C. Ex. 33 | C. Ex. 34 | C. Ex. 35 | C. Ex. 36 |
|---|---|---|---|---|
| COMPOSITIONS | | | | |
| PPE-Si | 0.00 | 0.00 | 0.00 | 0.00 |
| PPE 0.40 | 51.84 | 0.00 | 0.00 | 0.00 |
| PPE 0.46 | 0.00 | 57.81 | 54.83 | 51.84 |
| BPADP | 25.87 | 19.90 | 22.89 | 25.87 |
| Glass fiber | 19.90 | 19.90 | 19.90 | 19.90 |
| LLDPE | 1.49 | 1.49 | 1.49 | 1.49 |
| AO 168 | 0.10 | 0.10 | 0.10 | 0.10 |
| ZnS | 0.15 | 0.15 | 0.15 | 0.15 |
| MgO | 0.15 | 0.15 | 0.15 | 0.15 |
| Carbon black | 0.50 | 0.50 | 0.50 | 0.50 |
| PROPERTIES | | | | |
| UL 94 rating at 0.75 mm | V-1 | V-1 | V-1 | V-0 |
| HDT (° C.) | 100 | 120 | 110 | 100 |
| Flex. modulus (MPa) | 6661 | 6638 | 6539 | 6717 |
| Flex. strength (MPa) | 145 | 161 | 153 | 146 |

Examples 27-43, Comparative Examples 37-39

These examples illustrate the attainment of a UL 94 V-0 rating at a thickness of 1.5 millimeters by compositions comprising as little as 0.5 weight percent of a poly(phenylene ether)-polysiloxane block copolymer reaction product. They further illustrate compositions comprising a first poly(phenylene ether) (derived from the poly(phenylene ether)-polysiloxane block copolymer reaction product) and a second poly(phenylene ether) (separately added; see Examples 28-43).

Notched Izod values and unnotched Izod values, each expressed in units of joules/meter, were determined according to ASTM D256-08 at 25° C. using a hammer energy of 2 foot-pounds (2.71 joules), and bar cross-sectional dimensions of 3.2 by 12.7 millimeters. Flexural modulus, flexural stress at yield, and flexural stress at break values, each in units of megapascals, were determined at 23° C. according to ASTM D 790-07e1 using 6 4 millimeter thick bars, a support span of 101.6 millimeters, a test speed of 2.54 millimeters/minute (0.1 inch/minute; Procedure A), and three specimens per composition. Tensile modulus and tensile stress at break values, each expressed in units of megapascals, and tensile elongation at break values, expressed in units of percent, were determined according to ASTM D 638-08 at 23° C. using a Type I bar having a thickness of 3 2 millimeters, a gage length of 50 millimeters, and a testing speed of 5 millimeters per minute.

The results demonstrate that compositions with 0.5 to 40 weight percent poly(phenylene ether)-polysiloxane block copolymer reaction product exhibit a UL 94 V-0 rating at a thickness of 1.5 millimeters. Although physical properties were not measured for all samples, the available results show that compositions with 2 to 40 weight percent poly(phenylene ether)-polysiloxane block copolymer reaction product further exhibit a heat deflection temperature of at least 150° C. determined according to ASTM D 648-07 using a stress of 1.82 megapascals (MPa) and a sample thickness of 6 4 millimeters, and a flexural modulus of at least 5,000 megapascals measured at 23° C. according to ASTM D 790-07e1 using a sample thickness of 6.4 millimeters. Comparative Examples 37 and 38, without poly(phenylene ether)-polysiloxane block copolymer, and Comparative Example 39, with only 0.4 weight percent poly(phenylene ether)-polysiloxane block copolymer, do not achieve a UL 94 V-0 rating at a thickness of 1.5 millimeters.

TABLE 10

|  | Ex. 27 | Ex. 28 | Ex. 29 | Ex. 30 | Ex. 31 |
|---|---|---|---|---|---|
| COMPOSITIONS | | | | | |
| PPE-Si | 68.2 | 40.0 | 30.0 | 20.0 | 10.0 |
| PPE 0.33 | 0.0 | 0.0 | 0.0 | 0.0 | 0.0 |
| PPE 0.30 | 0.0 | 30.8 | 39.3 | 48.8 | 56.8 |
| PDMS/silica | 0.0 | 0.0 | 0.0 | 0.0 | 0.0 |
| PDMS | 0.0 | 0.0 | 0.0 | 0.0 | 0.0 |
| HCR | 4.0 | 0.0 | 0.0 | 0.0 | 0.0 |
| SEBS | 0.0 | 1.0 | 2.0 | 2.0 | 3.0 |
| AO 626 | 0.8 | 0.0 | 0.0 | 0.0 | 0.0 |
| AO 168 | 0.0 | 0.2 | 0.2 | 0.2 | 0.2 |
| BPADP | 7.0 | 8.0 | 8.5 | 9.0 | 10.0 |
| Glass fiber | 20.0 | 20.0 | 20.0 | 20.0 | 20.0 |
| Polysiloxane content | 3.4 | 2.0 | 1.5 | 1.0 | 0.5 |
| PROPERTIES | | | | | |
| UL Rating at 1.5 mm | V-0 | V-0 | V-0 | V-0 | V-0 |
| UL Rating at 1.0 mm | V-0 | V-0 | V-0 | V-0 | V-0 |
| HDT (° C.) | 153 | 159 | 159 | 157 | 153 |
| Notched Izod (J/m) | 69.8 | 87.8 | 95.2 | 90.8 | 96 |
| Unnotched Izod (J/m) | 338 | 466 | 478 | 492 | 457 |
| Flex. modulus (MPa) | 5460 | 5240 | 5210 | 5090 | 5180 |
| Flex. stress at yield (MPa) | 131 | 140 | 143 | 140 | 143 |
| Flex. stress at break (MPa) | 132 | 141 | 140 | 140 | 143 |

TABLE 10-continued

| | | | | | |
|---|---|---|---|---|---|
| Tens. modulus (MPa) | 6900 | 6818 | 6784 | 6768 | 6784 |
| Tensile stress at break (MPa) | 114 | 119 | 118 | 120 | 120 |
| Tens. elong. at break (%) | 2.2 | 2.5 | 2.5 | 2.5 | 2.5 |

| | C. Ex. 37 | Ex. 32 | Ex. 33 | Ex. 34 | Ex. 35 |
|---|---|---|---|---|---|
| COMPOSITIONS | | | | | |
| PPE-Si | 0.0 | 20.0 | 10.0 | 8.0 | 6.0 |
| PPE 0.33 | 0.0 | 0.0 | 0.0 | 0.0 | 0.0 |
| PPE 0.30 | 65.8 | 47.8 | 57.8 | 59.8 | 61.8 |
| PDMS/silica | 0.0 | 0.0 | 0.0 | 0.0 | 0.0 |
| PDMS | 0.0 | 0.0 | 0.0 | 0.0 | 0.0 |
| HCR | 0.0 | 0.0 | 0.0 | 0.0 | 0.0 |
| SEBS | 4.0 | 2.0 | 2.0 | 2.0 | 2.0 |
| AO 626 | 0.0 | 0.0 | 0.0 | 0.0 | 0.0 |
| AO 168 | 0.2 | 0.20 | 0.20 | 0.20 | 0.20 |
| BPADP | 10.0 | 10.0 | 10.0 | 10.0 | 10.0 |
| Glass fiber | 20.0 | 20.0 | 20.0 | 20.0 | 20.0 |
| Polysiloxane content | 0.0 | 1.0 | 0.5 | 0.4 | 0.3 |
| PROPERTIES | | | | | |
| UL Rating at 1.5 mm | V-1 | V-0 | V-0 | V-0 | V-0 |
| UL Rating at 1.0 mm | V-1 | — | — | — | — |
| HDT (° C.) | 153 | 153 | 154 | 155 | 155 |
| Notched Izod (J/m) | 101 | 79.8 | 82.0 | 86.6 | 83.3 |
| Unnotched Izod (J/m) | 515 | 495 | 516 | 503 | 511 |
| Flex. modulus (MPa) | 5270 | 5330 | 5390 | 5400 | 5400 |
| Flex. stress at yield (MPa) | 147 | — | — | — | — |
| Flex. stress at break (MPa) | 144 | 133 | 135 | 134 | 138 |
| Tens. modulus (MPa) | 6694 | — | — | — | — |
| Tensile stress at break (MPa) | 117 | — | — | — | — |
| Tens. elong. at break (%) | 2.5 | — | — | — | — |

| | Ex. 36 | Ex. 37 | C. Ex. 38 | Ex. 38 | Ex. 39 |
|---|---|---|---|---|---|
| COMPOSITIONS | | | | | |
| PPE-Si | 4.0 | 2.0 | 0.0 | 4.0 | 2.0 |
| PPE 0.33 | 0.0 | 0.0 | 0.0 | 63.8 | 65.8 |
| PPE 0.30 | 63.8 | 65.8 | 67.8 | 0.0 | 0.0 |
| PDMS/silica | 0.0 | 0.0 | 0.0 | 0.0 | 0.0 |
| PDMS | 0.0 | 0.0 | 0.0 | 0.0 | 0.0 |
| HCR | 0.0 | 0.0 | 0.0 | 0.0 | 0.0 |
| SEBS | 2.0 | 2.0 | 2.0 | 2.0 | 2.0 |
| AO 626 | 0.0 | 0.0 | 0.0 | 0.0 | 0.0 |
| AO 168 | 0.2 | 0.20 | 0.20 | 0.20 | 0.20 |
| BPADP | 10.0 | 10.0 | 10.0 | 10.0 | 10.0 |
| Glass fiber | 20.0 | 20.0 | 20.0 | 20.0 | 20.0 |
| Polysiloxane content | 0.2 | 0.1 | 0.0 | 0.2 | 0.1 |
| PROPERTIES | | | | | |
| UL Rating at 1.5 mm | V-0 | V-0 | V-1 | V-0 | V-0 |
| UL Rating at 1.0 mm | — | — | — | — | — |
| HDT (° C.) | 155 | 155 | 156 | — | — |
| Notched Izod (J/m) | 81.1 | 79.5 | 81.3 | — | — |
| Unnotched Izod (J/m) | 496 | 475 | 475 | — | — |
| Flex. modulus (MPa) | 5460 | 5490 | 5560 | — | — |
| Flex. stress at yield (MPa) | — | — | — | — | — |
| Flex. stress at break (MPa) | 133 | 138 | 135 | — | — |
| Tens. modulus (MPa) | — | — | — | — | — |
| Tensile stress at break (MPa) | — | — | — | — | — |
| Tens. elong. at break (%) | — | — | — | — | — |

| | Ex. 40 | Ex. 41 | Ex. 42 | Ex. 43 | C. Ex. 39 |
|---|---|---|---|---|---|
| COMPOSITIONS | | | | | |
| PPE-Si | 1.0 | 0.50 | 1.60 | 0.80 | 0.40 |
| PPE 0.33 | 66.8 | 67.3 | 66.2 | 67.0 | 67.4 |
| PPE 0.30 | 0.0 | 0.0 | 0.0 | 0.0 | 0.0 |
| PDMS/silica | 0.0 | 0.0 | 0.0 | 0.0 | 0.0 |
| PDMS | 0.0 | 0.0 | 0.0 | 0.0 | 0.0 |
| HCR | 0.0 | 0.0 | 0.0 | 0.0 | 0.0 |
| SEBS | 2.0 | 2.0 | 2.0 | 2.0 | 2.0 |
| AO 626 | 0.0 | 0.0 | 0.0 | 0.0 | 0.0 |
| AO 168 | 0.2 | 0.20 | 0.20 | 0.20 | 0.20 |
| BPADP | 10.0 | 10.0 | 10.0 | 10.0 | 10.0 |
| Glass fiber | 20.0 | 20.0 | 20.0 | 20.0 | 20.0 |
| Polysiloxane content | 0.05 | 0.025 | 0.08 | 0.04 | 0.02 |
| PROPERTIES | | | | | |
| UL Rating at 1.5 mm | V-0 | V-0 | V-0 | V-0 | V-1 |
| UL Rating at 1.0 mm | — | — | — | — | — |
| HDT (° C.) | — | — | — | — | — |
| Notched Izod (J/m) | — | — | — | — | — |
| Unnotched Izod (J/m) | — | — | — | — | — |
| Flex. modulus (MPa) | — | — | — | — | — |
| Flex. stress at yield (MPa) | — | — | — | — | — |
| Flex. stress at break (MPa) | — | — | — | — | — |
| Tens. modulus (MPa) | — | — | — | — | — |
| Tensile stress at break (MPa) | — | — | — | — | — |
| Tens. elong. at break (%) | — | — | — | — | — |

Example 44

This example illustrates a composition exhibiting high flame retardancy, heat resistance, and melt flow.

TABLE 11

| | Ex. 44 |
|---|---|
| COMPOSITION | |
| PPE-Si | 5.97 |
| PPE 0.33 | 65.46 |
| SEBS | 1.99 |
| AO 168 | 0.20 |
| BPADP | 10.95 |
| Carbon black | 0.50 |
| Glass fiber | 14.93 |
| Polysiloxane content | 0.30 |
| PROPERTIES | |
| UL Rating at 1.5 mm | V-0 |
| HDT (° C.) | 152 |
| Flex. modulus (MPa) | 4790 |
| Flex. strength (MPa) | 132 |
| MVR (cc/10 min) | 24 |

The invention claimed is:

1. An article comprising a composition,
wherein the article is a fuser holder; and
wherein the composition comprises
2 to 10 weight percent of a poly(phenylene ether)-polysiloxane block copolymer reaction product comprising a poly(phenylene ether)-polysiloxane block copolymer and a first poly(phenylene ether);
55 to 75 weight percent of a second poly(phenylene ether);
5 to 25 weight percent of a flame retardant comprising an organophosphate ester, a phosphazene, or a combination thereof; and
10 to 35 weight percent of a reinforcing filler;
wherein all weight percent values are based on the total weight of the composition.

2. The article of claim 1, wherein the poly(phenylene ether)-polysiloxane block copolymer comprises a poly(phenylene ether) block comprising phenylene ether repeat units having the structure

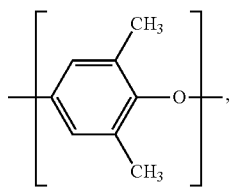

and
a polysiloxane block having the structure

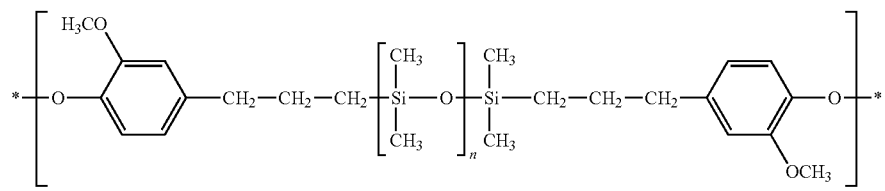

wherein n is 30 to 60.

3. The article of claim 1, wherein the poly(phenylene ether)-polysiloxane block copolymer comprises a poly(phenylene ether)-polysiloxane multiblock copolymer.

4. The article of claim 1, wherein the reinforcing filler is selected from the group consisting of glass fibers, carbon fibers, wollastonite, halloysite, clays, talcs, micas, glass flakes, solid glass beads, hollow glass beads, solid ceramic beads, hollow ceramic beads, and combinations thereof.

5. The article of claim 1, wherein the reinforcing filler comprises glass fibers.

6. The article of claim 1, wherein the composition further comprises 1 to 10 weight percent of an impact modifier selected from the group consisting of rubber-modified polystyrenes, unhydrogenated block copolymers of an alkenyl aromatic monomer and a conjugated diene, hydrogenated block copolymers of an alkenyl aromatic monomer and a conjugated diene, acrylate core-shell impact modifiers, and combinations thereof.

7. The article of claim 1, wherein the composition comprises 10 to 20 weight percent of the reinforcing filler, and the reinforcing filler comprises glass fibers.

8. The article of claim 1, wherein the composition further comprises 1 to 5 weight percent of a hydrogenated block copolymer of an alkenyl aromatic compound and a conjugated diene.

9. The article of claim 1, wherein the flame retardant comprises the organophosphate ester.

10. The article of claim 9, wherein the organophosphate ester comprises bisphenol A bis(diphenyl phosphate).

11. The article of claim 1, wherein the flame retardant comprises the phosphazene.

12. The article of claim 11, wherein the flame retardant comprises a cyclic oligo(bis(phenoxy)phosphazene), a linear oligo(bis(phenoxy)phosphazene), a linear poly(bis(phenoxy)phosphazene), a crosslinked poly(bis(phenoxy)phosphazene), or a combination thereof.

13. An article comprising a composition,
wherein the article is a fuser holder;
wherein the composition comprises
2 to 10 weight percent of a poly(phenylene ether)-polysiloxane block copolymer reaction product comprising a poly(phenylene ether)-polysiloxane block copolymer and a first poly(phenylene ether);

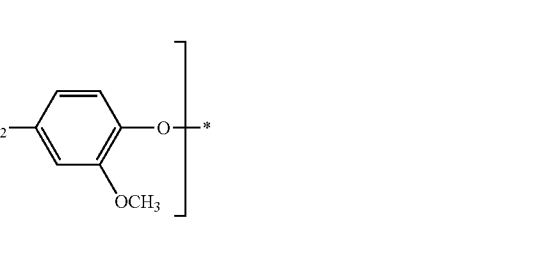

wherein the poly(phenylene ether)-polysiloxane block copolymer comprises a poly(phenylene ether) block comprising phenylene ether repeat units having the structure

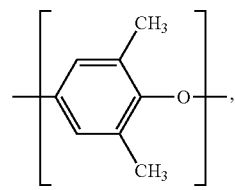

and
a polysiloxane block having the structure

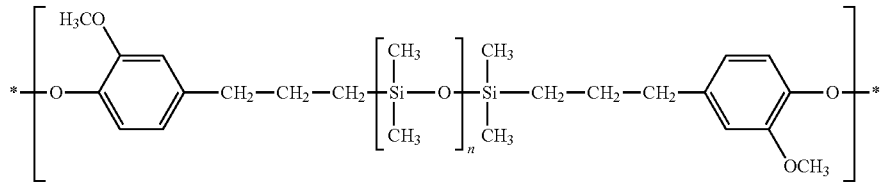

wherein n is 30 to 60; and wherein the first poly(phenylene ether) comprises poly(2,6-dimethyl-1,4-phenylene ether);
55 to 75 weight percent of a second poly(phenylene ether) comprising poly(2,6-dimethyl-1,4-phenylene ether);
10 to 20 weight percent of a reinforcing filler comprising glass fibers;
5 to 15 weight percent of a flame retardant comprising bisphenol A bis(diphenyl phosphate); and
1 to 5 weight percent of a polystyrene-poly(ethylene-butylene)-polystyrene block copolymer;
wherein all weight percent values are based on the total weight of the composition.

14. An article comprising a composition,
wherein the article is selected from the group consisting of fan blades, battery parts for hybrid and electric vehicles, parts for automotive kinetic energy recovery systems, and electric vehicle junction boxes;
wherein the composition comprises
53 to 63 weight percent of a poly(phenylene ether)-polysiloxane block copolymer reaction product comprising a poly(phenylene ether)-polysiloxane block copolymer and a first poly(phenylene ether); wherein the poly(phenylene ether)-polysiloxane block copolymer comprises a poly(phenylene ether) block comprising phenylene ether repeat units having the structure

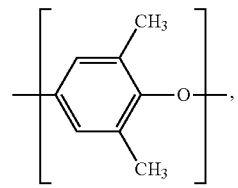

and
a polysiloxane block having the structure

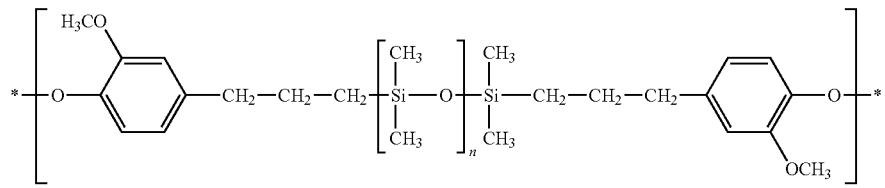

wherein n is 30 to 60;
15 to 25 weight percent of a reinforcing filler comprising glass fibers;
15 to 25 weight percent of a flame retardant comprising bisphenol A bis(diphenyl phosphate); and
0.5 to 3 weight percent of a linear low density polyethylene;
wherein all weight percent values are based on the total weight of the composition.

* * * * *